United States Patent
Hefley et al.

(10) Patent No.: US 11,463,407 B2
(45) Date of Patent: Oct. 4, 2022

(54) POLICY ENGINE FOR CYBER ANOMALY DETECTION

(71) Applicant: Raytheon Company, Waltham, MA (US)

(72) Inventors: Kendall L. Hefley, Royse City, TX (US); Peter L. Stewart, Rowlett, TX (US); Gregory A. Ladd, Frisco, TX (US)

(73) Assignee: Raytheon Company, Waltham, MA (US)

( * ) Notice: Subject to any disclaimer, the term of this patent is extended or adjusted under 35 U.S.C. 154(b) by 437 days.

(21) Appl. No.: 16/510,293

(22) Filed: Jul. 12, 2019

(65) Prior Publication Data

US 2020/0021560 A1 Jan. 16, 2020

Related U.S. Application Data

(60) Provisional application No. 62/697,541, filed on Jul. 13, 2018.

(51) Int. Cl.
*H04L 29/06* (2006.01)
*H04L 9/40* (2022.01)
*G06F 9/54* (2006.01)

(52) U.S. Cl.
CPC ............ *H04L 63/0245* (2013.01); *G06F 9/54* (2013.01); *H04L 63/0263* (2013.01); *H04L 63/1416* (2013.01)

(58) Field of Classification Search
CPC ............. H04L 63/0245; H04L 63/0263; H04L 63/0254; H04L 63/1416; H04L 63/1408; H04L 63/0218; H04L 63/20; G06F 9/54; G06F 21/552; G05B 19/058
See application file for complete search history.

(56) References Cited

U.S. PATENT DOCUMENTS

| 2016/0344754 | A1* | 11/2016 | Rayapeta | ............ H04L 63/1416 |
| 2017/0126745 | A1 | 5/2017 | Taylor | |
| 2017/0214717 | A1* | 7/2017 | Bush | .................. G05B 19/4185 |

FOREIGN PATENT DOCUMENTS

| WO | WO-2014042636 A1 * | 3/2014 | ......... H04L 63/1416 |
| WO | WO-2014042636 A1 | 3/2014 | |
| WO | WO-2020014614 A1 | 1/2020 | |

OTHER PUBLICATIONS

"Model-Driven design of Industrial Control Systems" by Marga Marcos (Year: 2008).*

(Continued)

*Primary Examiner* — Tri M Tran
(74) *Attorney, Agent, or Firm* — Schwegman Lundberg & Woessner, P.A.

(57) ABSTRACT

An industrial control system (ICS) communicates via ICS protocols. A model is deployed in an information technology (IT) and operation technology (OT) network. Security policies are dynamically updated as the particular IT and OT network are used, patched, and modified. A deep packet inspection is used to enforce ICS constraints and ICS behaviors defined by the initial model. A state of the deep packet inspection is reported for situational awareness and debugging purposes. An alert is transmitted when anomalies are detected when ICS protocol traffic traverses ICS firewall network paths that execute ICS policies.

18 Claims, 16 Drawing Sheets

(56) References Cited

OTHER PUBLICATIONS

"Torino™ EtherNet/IP Enforcer Loadable Security Module (LSM) (Product Bulletin 1090TAG)", Tofino Security—A Belden Brand, (2014), 2 pgs.

"Tofino™ Modbus TCP Enforcer Loadable Security Module (LSM) (Public Bulletin 1087TAG)", Tofino Security—A Belden Brand, (2014), 2 pgs.

"International Application Serial No. PCT/US2019/041606, International Search Report dated Dec. 9, 2019", 6 pgs.

"International Application Serial No. PCT/US2019/041606, Invitation to Pay Add'l Fees and Partial Search Report dated Oct. 15, 2019", 13 pgs.

"International Application Serial No. PCT/US2019/041606, Written Opinion dated Dec. 9, 2019", 11 pgs.

"Fortinet FortiGate Firewalls", Firewalls.com Inc., [Online]. Retrieved from the Internet: <URL: https://www.firewalls.com/products/firewalls/fortigate?gclid=EAlalQobChMliKXstMPa4wIVR9bACh1LNQ_dEAAYASAAEgIN1fD_BwE.> (Accessed Aug. 2, 2019), 4 pgs.

"International Application Serial No. PCT/US2019/041606, International Preliminary Report on Patentability dated Jan. 28, 2021", 13 pgs.

\* cited by examiner

POLICY ENGINE FOR CYBER ANOMALY DETECTION

RELATED APPLICATIONS

The present application claims priority to U.S. Provisional Application Ser. No. 62/697,541 filed on Jul. 13, 2018, which is incorporated herein by reference in its entirety.

TECHNICAL FIELD

Embodiments described herein generally relate to policy engines for cyber anomaly detection.

BACKGROUND

Industrial Control Systems (ICSs) have an evolution that spans decades, before cyber security was an issue, and are built to emphasize availability and physical safety, not cyber security. The systems operate on implicit trust; assuming all messages come from the right place and contain true content. Industrial Control Systems contain physical actuators and motors, user command input systems, and software/firmware processing, and are increasingly being connected to larger information technology (IT) enterprise networks without a full defense-in-depth cyber security strategy. This results in multiple possible attack vectors for a hostile cyber actor. Current solutions concentrate on workstation access control and network security through Intrusion Detection appliances, whitelisting, firewalls, and authentication/authorization policy enforcement at the perimeter. These solutions are not effective once a bad actor has breached the perimeter and industrial protocol messages can be generated by such a bad actor that are implicitly trusted.

Figure 1:
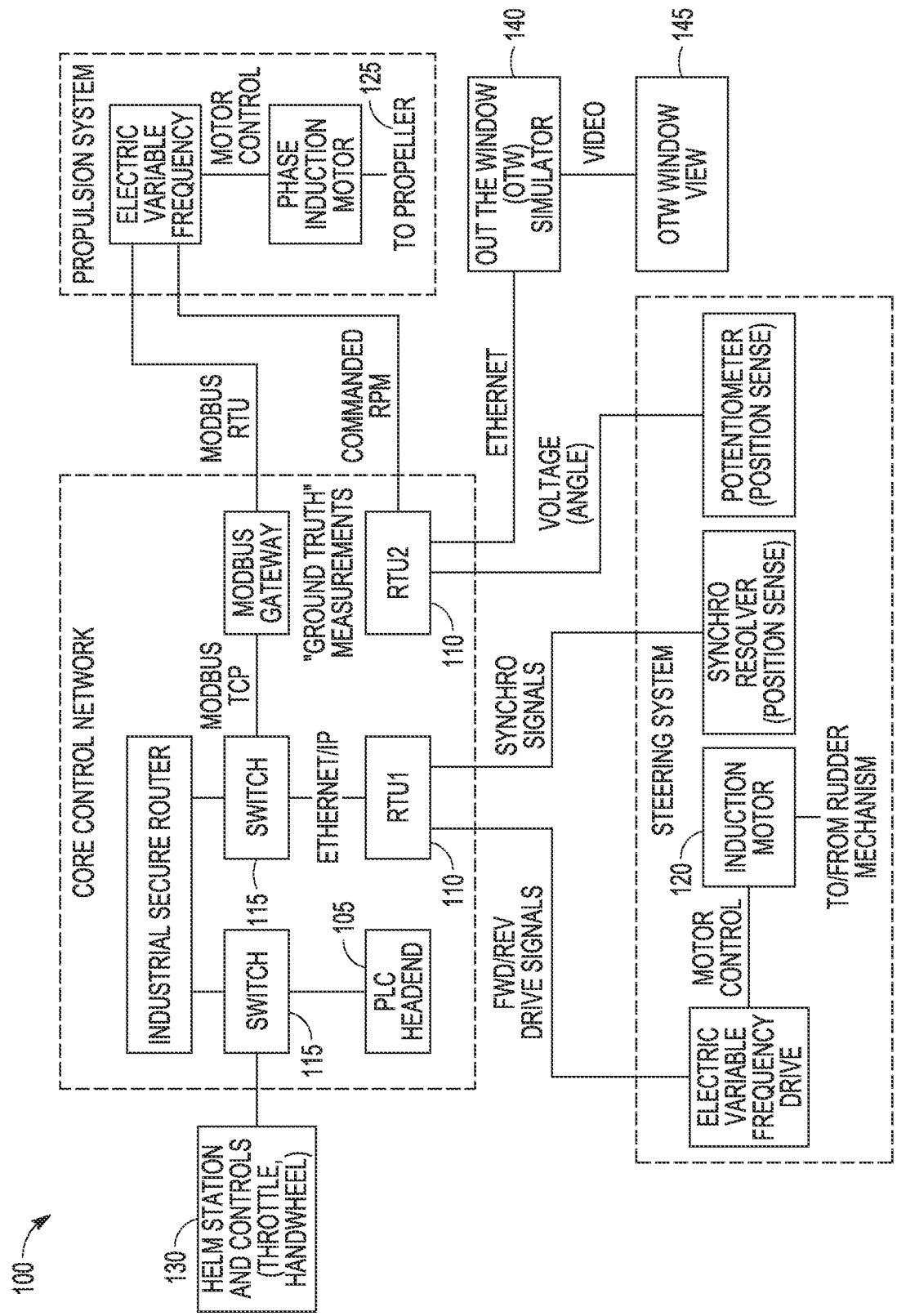
FIG. 1 illustrates, by way of example, a simulated hull mechanical and electrical network (HM&E) Industrial Control System (ICS).

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Various embodiments described herein are directed to protecting industrial control systems (ICS) by tracking the state of the control system and adaptively changing a rule-based gateway for monitoring and filtering malicious network traffic. In various embodiments, the ICS is used for Hull Mechanical and Electrical (HM&E) systems on naval ships. In addition, behavior-based approaches may be used to detect and prevent cyberattacks against the real-time control systems on ICS.

An embodiment, which can be referred to as a Dynamic Policy Engine, works in conjunction with a firewall, which can do deep packet inspection on industrial protocols, to validate the content and context of industrial control messages as they traverse an ethernet wire. One such firewall that can be used in connection with the current disclosure is provided by Bayshore Networks of Bethesda, Md.

In an embodiment, an application firewall defines and enforces which devices are on the network and which industrial protocols they are using. The firewall also has the ability to do deep packet inspection on high level message content. The firewall uses configuration files and templates to configure security rules and has the ability to load configurations via Secure Shell (SSH). Another industrial control system (ICS) application firewall includes application and user-identity awareness, content security with integrated intrusion prevention, antivirus, and web filtering, secure sockets layer (SSL) encryption, and advanced threat detection and remediation. This other ICS application firewall has deep packet inspection capabilities and can monitor for signatures to police most of the common ICS/SCADA protocols.

However, an embodiment takes a systematic approach to ICS cyber defense in depth and creates a stateful policy enforcement engine to address the unique characteristics of an ICS. The embodiment starts with a transparent defensive network appliance. The network appliance focuses on securing the unique standards and practices (EthernetIP, MODBUS) used in ICS technology. The network appliance acts upon the contents of network packets in ways that are unique to ICS systems, and which cannot be done by off-the-shelf firewall appliances. The dynamic policy engine works in conjunction with an application firewall. One such application firewall is Bayshore's SingleKey. The application firewall allows for an industrial control system's domain to be modelled in configuration to define one or more system's intra-system and inter-system behavior, protocols, and equipment data items' operating constraints. The dynamic policy engine converts these XML models into industrial protocol specific firewall policies which enforce the defined models. The model allows the remediation action to be defined for each violation to report the violation for intrusion detection or to block the protocol message and report the violation for intrusion prevention. The policy enforcement capabilities include: detecting/preventing protocol operations and references for equipment/data items/addresses outside of the defined system models, detecting/preventing protocol operations outside of the defined constraints, detecting/preventing protocol operations from sources not authorized through whitelists, and enforcing state machine behavior. The state machine is enforced by validating state transitions within a single data item or across multiple data items from multiple systems. The dynamic policy engine application is a closed loop system which uploads the policies to one or more application firewall instances, and then monitors the real time output of the application firewall policy logging to forward violation alerts and state information to a Security Operations Center (SOC) graphical user interface (GUI). The dynamic policy engine also has the ability to react to state transitions to create new policy rules on the fly and upload them to application firewall instances.

The dynamic policy engine abstracts the complexity of building and maintaining comprehensive cyber protection policies for the application firewall. It reduces policy development time and allows the systems and their components to be defined by a domain expert rather than a policy engineer. By simply defining data items of components of an ICS system, the dynamic policy engine gets out of the box interface spec level validation of the protocol operations traversing the ethernet wire. With closed loop monitoring, the dynamic policy engine gets real time alerts of violations of policy rules which can indicate unauthorized intrusions and malicious cyber activity. The dynamic policy engine allows a state machine to be defined and enforced using a fairly simple XML schema. An embodiment specifically applies to a ship's HM&E systems, but it can apply to any industrial control system.

Shipboard HM&E systems, such as propulsion, steering, electrical generation, etc., rely on commercial ICS system components to provide real-time control and monitoring of these systems. These Commercial Off-the-Shelf (COTS) systems were developed to provide high availability and physical safety but have limited protection against cyberattacks. The COTS system components rely on a form of implicit trust—any component within the system is treated as a trusted source or receiver of data. A cyber attacker achieving a foothold within the COTS system may exploit this implicit trust and inject malicious commands and/or false data that can disrupt, degrade, or even deny critical ship operations. New capabilities are required to address this issue and provide a level of protection for these systems.

Described embodiments detect and prevent data insertion/ "man in the middle" attacks where the attacker gains a foothold within the ICS network and uses that position of trust to inject network traffic that disrupts, degrades, or denies normal HM&E operations. Given that many of the COTS components in these systems have limited processor and memory capacity and are based on proprietary designs, various embodiments operate externally to the COTS equipment to prevent the need to modify existing controllers and sensors. Various embodiments also do not interfere with existing control loop operations while providing near real-time sensing and blocking of attacks.

FIG. 1 illustrates, by way of example, a simulated hull mechanical and electrical (HM&E) network ICS 100. The HM&E network may include industrial control equipment, e.g., programming logic controller (PLC) 105, remote-terminal unit (RTU) 110, switches 115, routers, variable speed drives, motors 120, rudders, propellers 125, helm computers and displays 130, and out-the-window computers 140 and displays 145. The components of the HM&E network may communicate using various protocols such as Ethernet/ Internet protocol (IP), Moans, etc.

Figure 2:
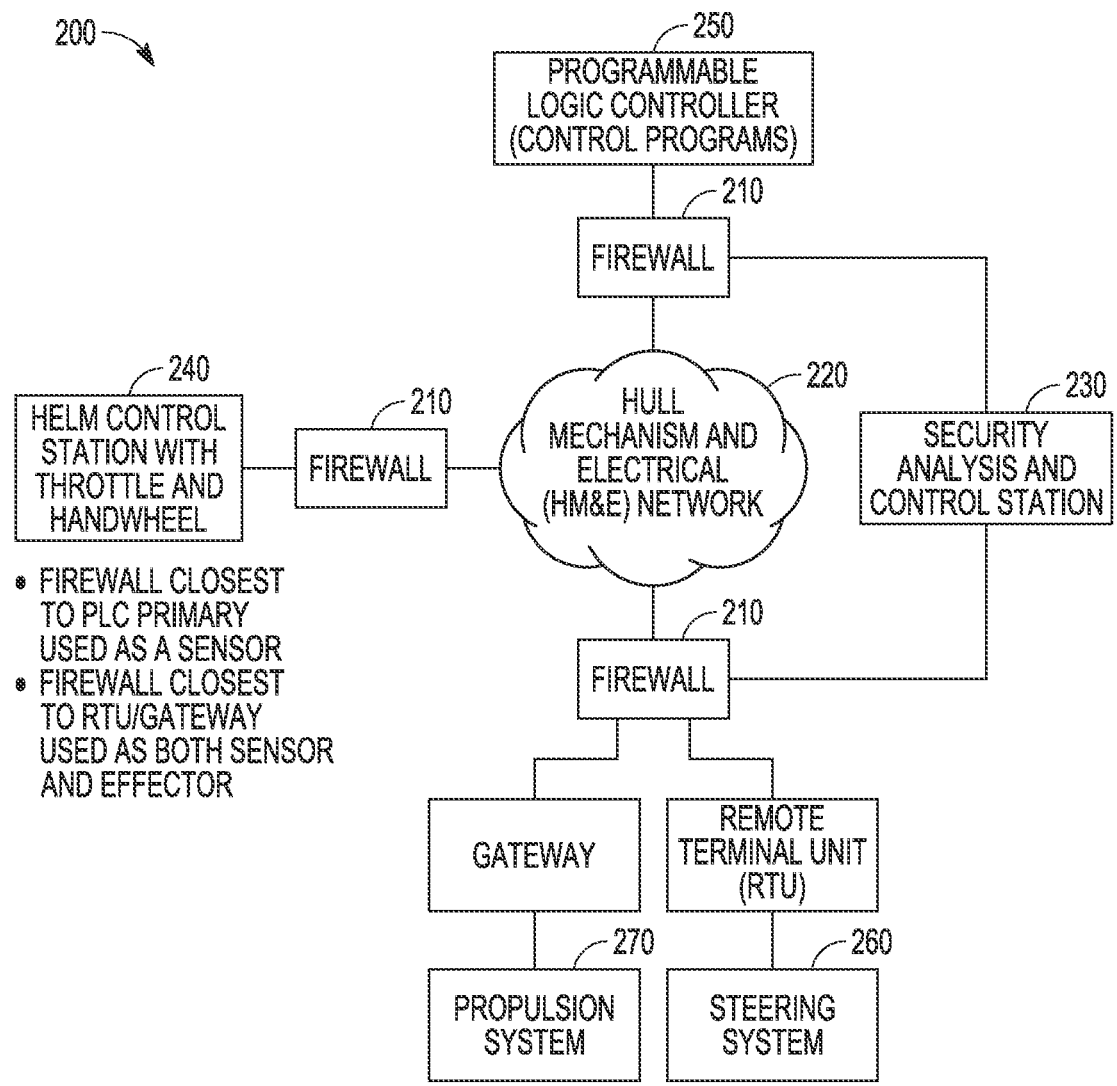
FIG. 2 illustrates, by way of example, a system for a protected hull mechanical and electrical network.

FIG. 2 illustrates, by way of example, a system 200 for a protected hull mechanical and electrical network. A firewall 210 that contains a policy engine is used as part of the system. The policy engine performs deep packet inspection on ICS protocols. The firewall may check ICS protocol packets content. The content may be used to enforce a policy by blocking packets that do not meet ICS protocol conditions or rules. Packets may be logged rather than blocked or both logged and blocked. Creating the policies for the firewall is a difficult task that can require ICS system component expertise, protocol expertise, network expertise, cyber expertise, and firewall policy expertise. In addition, multiples policies may also need to be built and managed for different ICS protocols for different components on the ICS system and also on multiple different network paths to one or more firewalls. Thus, building the proper policies is difficult and time consuming, but important to protecting ICSs.

While FIG. 2 illustrates a system for a protected hull, mechanical, and electrical (HM&E) network 220, embodiments of the present disclosure can be used with any industrial control system (ICS). For example, in an embodiment, an ICS includes one or more Industrial Control System (ICS) firewalls in a data network. The data network is part of the ICS. Such ICS firewalls execute a deep packet inspection among the several ICS systems that are associated with the data network. The ICS firewalls can also execute a deep packet inspection among components of an industrial system that uses ICS protocols. In an embodiment, the deep packet inspection involves checking specific fields within data messaging traffic within ICS protocol packets and blocking ICS protocol packets that do not meet ICS protocol conditions and rules. In an embodiment, the ICS firewalls include an application programming interface (API) for uploading firewall policies and attaching the firewall policies to an ICS firewall network path Additionally, the ICS firewalls can function as a sensor and/or an effector, and the ICS firewalls can employ a stateful policy enforcement that is specific to ICS operating constraints and ICS protocols.

The ICS further includes a dynamic policy engine. The dynamic policy engine includes a model of the ICS firewalls and of ICS component data. In an embodiment, the model of the ICS firewalls is an XML-based model. The dynamic policy engine converts XML models of the ICS systems and the components of the industrial system that uses ICS protocols. These dynamic policy engine models are associated with deployments of the ICS firewalls between segments of the data network.

The dynamic policy engine protects ICS protocol network traffic. Specifically, the dynamic policy engine includes cyber security policies 230 that are used to block the ICS protocol network traffic and/or transmit an alert when the ICS protocol network traffic traverses an ICS firewall network path that is not defined as a valid data item of a system component. In this manner, the dynamic policy engine automates generation, deployment, and monitoring of the cyber security policies.

The dynamic policy engine further uploads appropriately-generated ICS protocol-based policies to each ICS firewall network path. The ICS protocol-based policies are appropriately generated when the policies originate from a trusted source, such as an XML model of such policies. The ICS firewalls execute policy rules utilizing the deep packet inspection to validate a data value or value transition of a defined data item. In an embodiment, the ICS firewalls execute policy rules which set and persist variables. These variables can include a literal value, a variable value, a value derived from the deep packet inspection, and/or a mathematical expression that uses a mathematical operator such as addition, subtraction, division, multiplication, or a modulo in combination with any of the literal value, the variable value, or the value derived from the deep packet inspection. The dynamic policy engine further monitors an output stream of the ICS firewalls to output alerts when the cyber security policies are violated and outputs data item state information when policy logging rules are executed.

Other functions of other embodiments of the dynamic policy engine are as follows. The dynamic policy engine is operable to whitelist capabilities of the ICS firewalls. That is, only operations or values that are listed in the whitelist are allowed to go forward and traverse the ICS firewall network path. The use of the whitelist should have minimal timing impact on the ICS network. The dynamic policy engine can also generate policies that set ICS firewall variables as a state machine. Such a state machine instructs the ICS firewalls to employ stateful policy enforcement protections that dynamically adjust upon sensing feedback of the state of the ICS. The dynamic policy engine can also generate one or more ICS protocol specific policies to include submodules of policies with conditions to access different layers of data in the ICS data network, and further can generate rules to perform actions based on the state of the ICS systems on the data network. The dynamic policy engine monitors state information produced by logging rules in the ICS protocol-based policies and dynamically regenerates the ICS protocol-based policies and uploads the ICS protocol-based policies to the appropriate ICS firewall network path when defined in the XML, models to react to state transition triggers.

The ICS firewall may include transparent bridge ports inserted into multiple network paths between the helm computer 240, programmable logic controller (PLC) 250, rudder remote terminal unit (RTU) 260, and propeller RTU 270. Firewall policies may then be executed on traffic flow across all transparent bridges.

The protected hull mechanical and electrical network includes a behavior-based approach for defending ICS systems. This approach uses a "sense/analyze/decide/act" approach to track the operational state of the control loop for a given system and then enacts policies tailored to the operational state of the control loop. The ICS firewalls are deployed as gateways to support both sensing and blocking of traffic in the network connections between the Programmable Logic Controller (PLC) and the motor drives and sensors that manage the electromechanical systems. The ICS firewall in conjunction with the dynamic policy engine provides state and policy management by tracking the state of the control loop based on feedback from deep packet inspection to validate ICS traffic between the controller and the machinery system interfaces. This approach leverages the fact that the defender can track the state of each control loop by knowing what is being requested of the system and then enforcing policies consistent with that particular system state.

Figure 3:
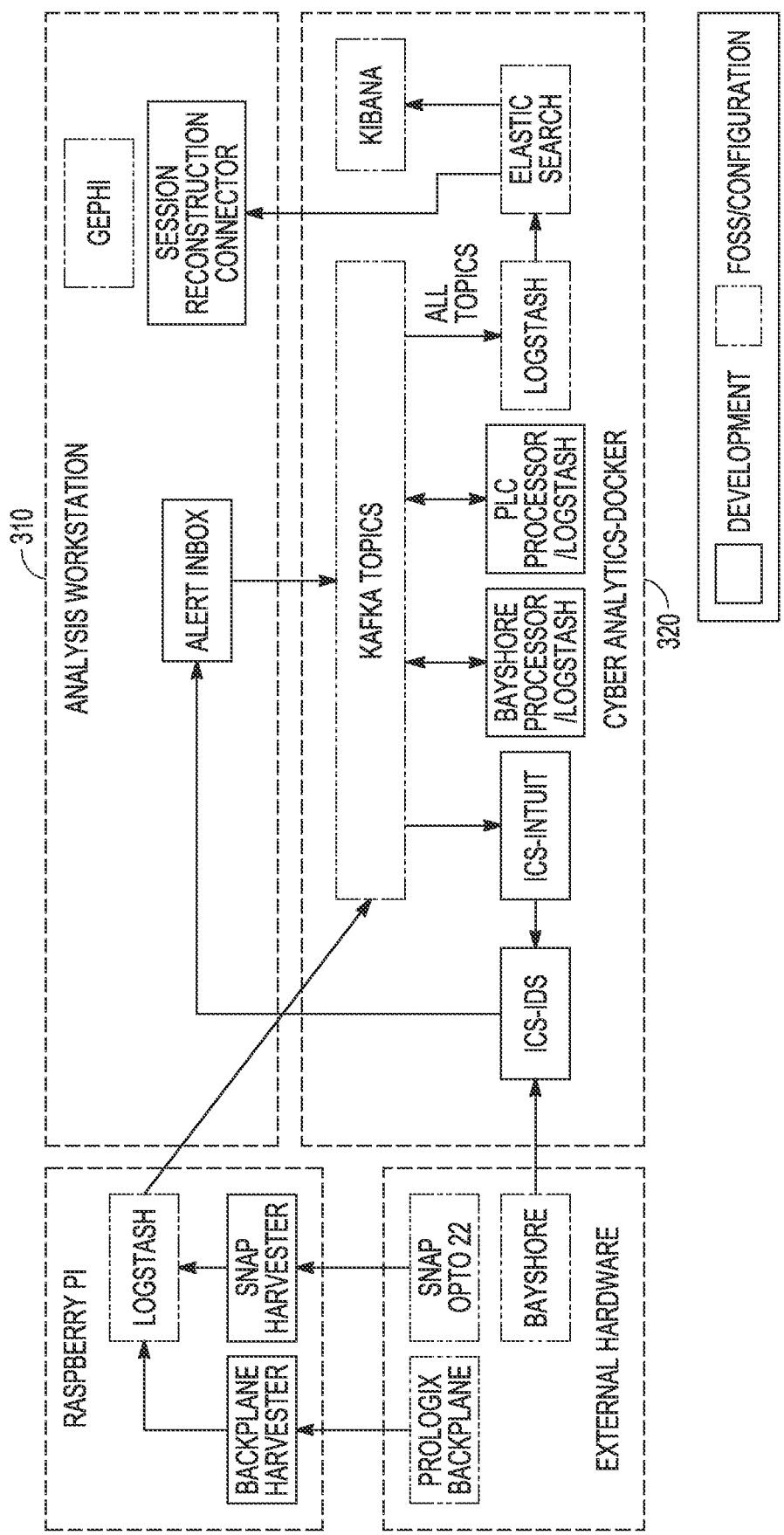
FIG. 3 illustrates, by way of example, a system for a protected ICS.
Figure 4:
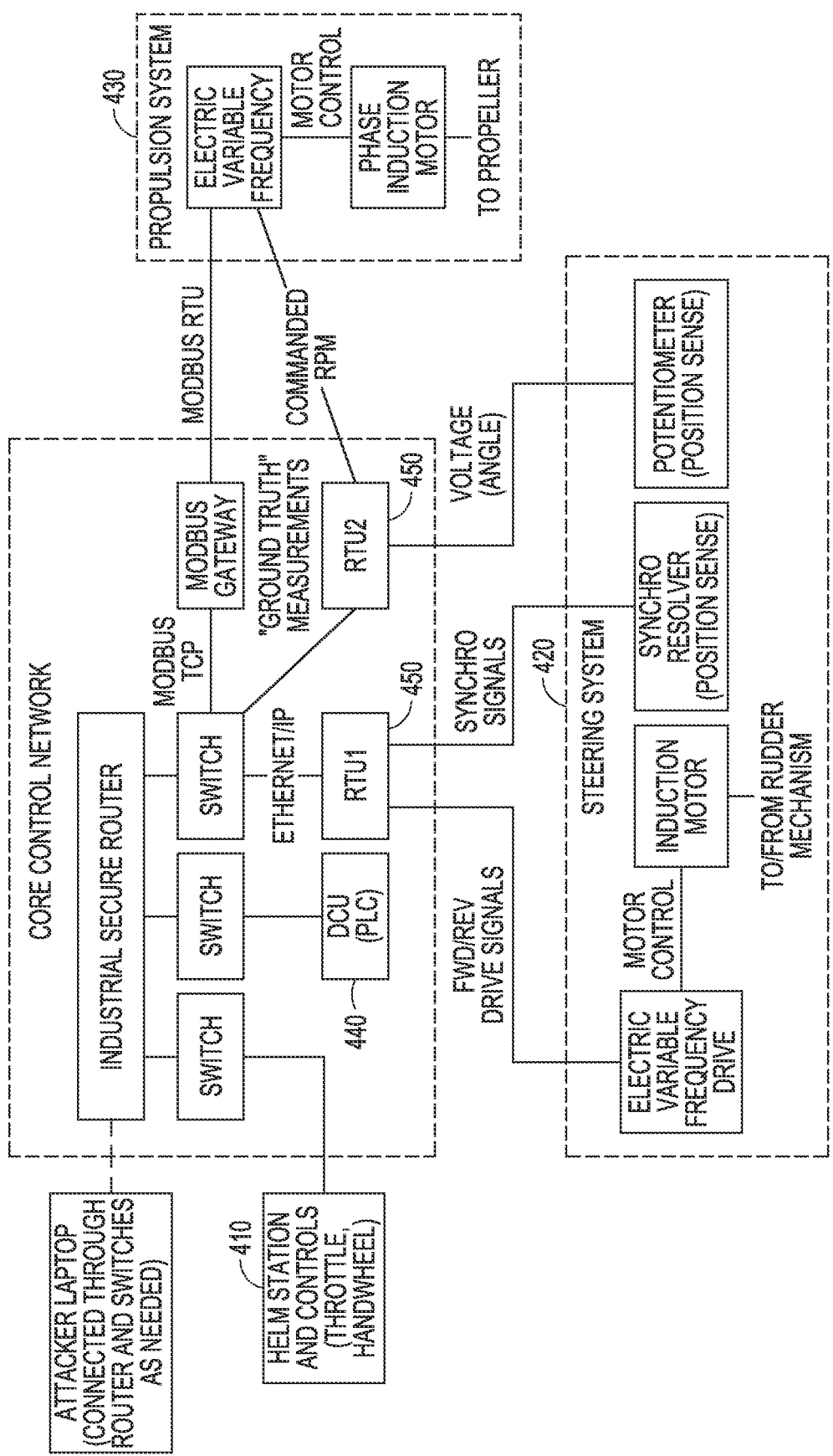
FIG. 4 illustrates, by way of example, a test system.

FIG. 3 illustrates, by way of example, a system for a protected ICS. The system includes an analytics capacity 310 built on top of the free and open-source software (FOSS) ElasticSearch-Logstash-Kafka stack 320. FIG. 4 illustrates, by way of example, a test system. The system is controlled through a helm control computer 410 that sends steering 420 and propulsion 430 commands, such as rudder order telegraph [ROT] and engine order telegraph [EOT] commands, to a distributed control unit (DCU) 440. The DCU contains a programmable logic controller (PLC) that controls the underlying machinery and sends status back to the helm control. The PLC controls the machinery either through direct connection to an electromechanical interface or through a separate device called a remote terminal unit (RTU) 450 interface that may combine both output (effector) and input (sensor) interfaces to the machinery. In an embodiment, the propulsion is based on a direct connection between the PLC and the motor drive controlling the propulsion motor while the steering system uses an RTU to control the steering motor and monitor the rudder position.

In an embodiment, a firewall is targeted as a true gateway function deployed between an IT (information Technology) network and an underlying Operational Technology (OT) network containing the actual ICS equipment. This is a common configuration in practice as the IT network often hosts critical business functions relating to overseeing production, ordering materials, and the like. The firewall provided a means to segment out traffic between the two networks and prevent attackers from transitioning across the IT network onto the underlying OT network for safety reasons. As such the firewall was primarily set up to provide gateway functionality at the application layer (Layer 7), even though the firewall itself provides underlying Layer 3 (the routing layer) functionality to bridge between the OT and IT networks.

Various embodiments apply the firewall capability against a different type of network topology. The core ICS network on a ship usually includes a redundant ring architecture of some type at its core, and the architecture employs a relatively flat topology to provide optimal safety and availability features, e.g., a singular PLC or Remote Terminal Equipment module is readily accessible from any of the redundant routers in the core.

Figure 5:
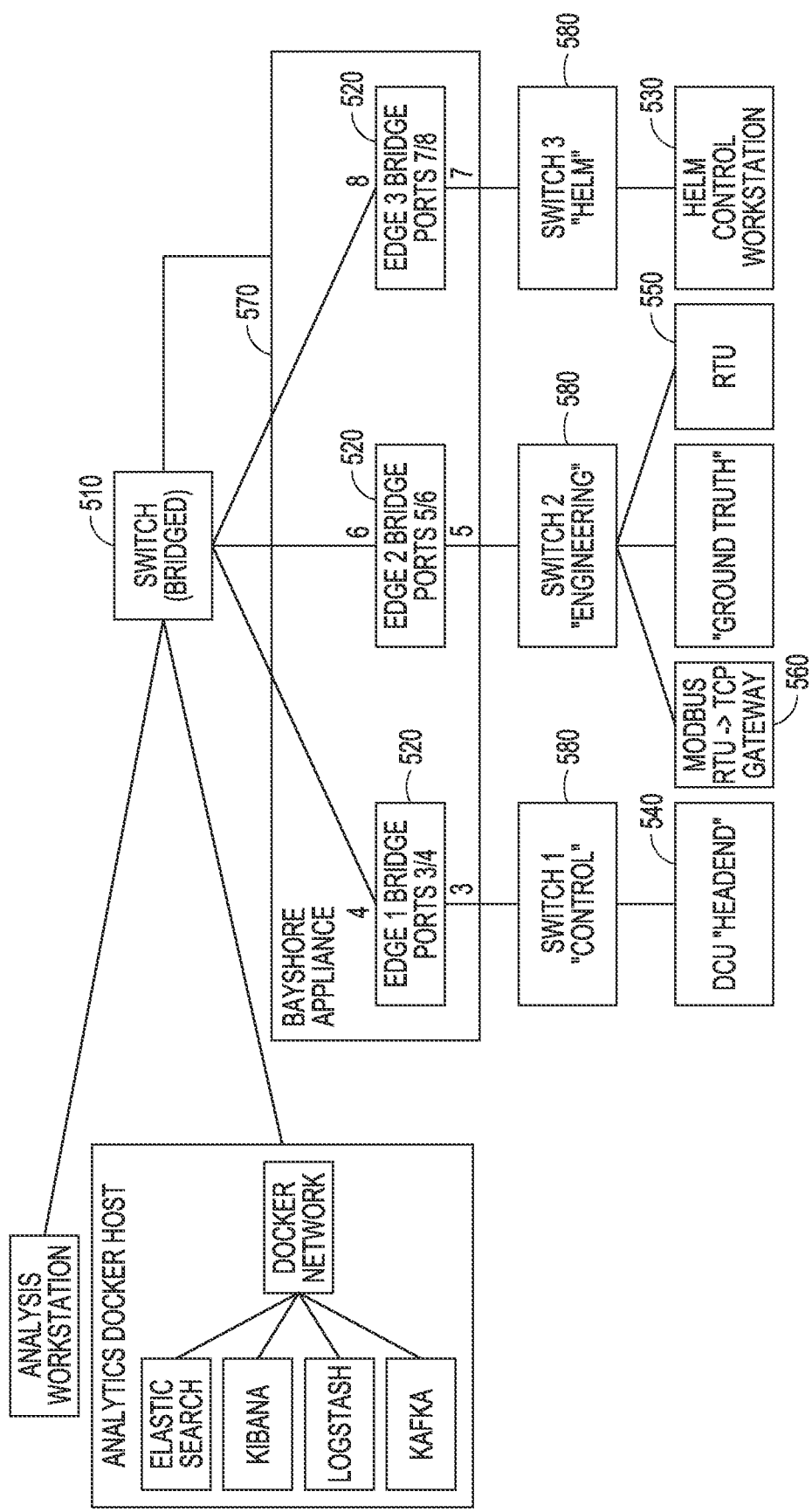
FIG. 5 illustrates, by way of example, a network topology of an ICS testbed.

Within an ICS test embodiment, the network topology is roughly emulated using a hierarchical switch configuration, with one core switch interacting with three distributed edge switches connected to the various system components. FIG. 5 illustrates, by way of example, a network topology of an ICS test embodiment. In an actual system, the core switch 510 could be part of part of a redundant ring of core switches, and a second set of connections would extend from one of the other core switches to the edge switches to provide redundancy. ICS firewall transparent bridges 520 are used to intercept network traffic between the helm control unit 530, the DCU 540, which contains the PLC, and the devices connected directly to the electromechanical systems, which include the RTU 550 connected to the steering interfaces and the Modbus gateway connected to the propulsion motor drive. Traffic intended for different subsystems, e.g., propulsion and steering, are therefore maintained on specific network paths through the ICS firewall. This allows the network to independently manage the network flows for each subsystem.

Embodiments may need to access these network flows to monitor and filter the data to protect the ICS system. Embodiments monitor state changes in the system by detecting which commands are issued from the helm control and how the PLC in the DCU responds to these changes. It then sets up specific rules to be enforced on the connections between the DCU and the endpoints, either the RTU connected to the steering system or the Modbus gateway 560 to the propulsion system. These rules may be tied to the operational state of the steering and propulsion subsystems as determined from what commands have been issued. The states of the propulsion and steering subsystems are tracked independently, and the system uses different rulesets to enforce security policies for each subsystem. This implies the need for various embodiments to have independent access to each network flow used for sensing purposes to drive the state machine model or used for filtering purposes to enforce the security rules. For the testbed embodiment this is done by having the firewall—which forms the core of RDG—span each of the connections between the central core and the edge switches. In an actual shipboard system, this would be done by placing redundant firewalls on the central core ring.

To support traffic flow along each of the links the firewall appliance 570 may support high-performance transparent bridging wherever it intersects the network link between the core and edge switches 580. In an embodiment, the firewall appliance comes in a 1U rack-mounted configuration with a total of eight 1 Gbps Ethernet network ports. This enables spanning the three network connections (e.g., links) between the core and edge switches in the testbed embodiment, as two Ethernet ports are required to span a link. Internal software of the appliance can support Layer 2 (link-based) bridging. This enables the appliance to act as a "bump in the wire", and the appliance can be installed directly on a link without requiring any re-configuration of the network address structure of the target system. Furthermore, the firewall appliance can be optimized to ensure that minimal delay is added to the traffic transiting the unit. This is also a critical criterium for the system, as the ICS control loops require that network latency be tightly controlled to ensure rapid command/response times. These network topology changes greatly enhanced the suitability of the RUG solution for use in shipboard environments.

Figure 6:
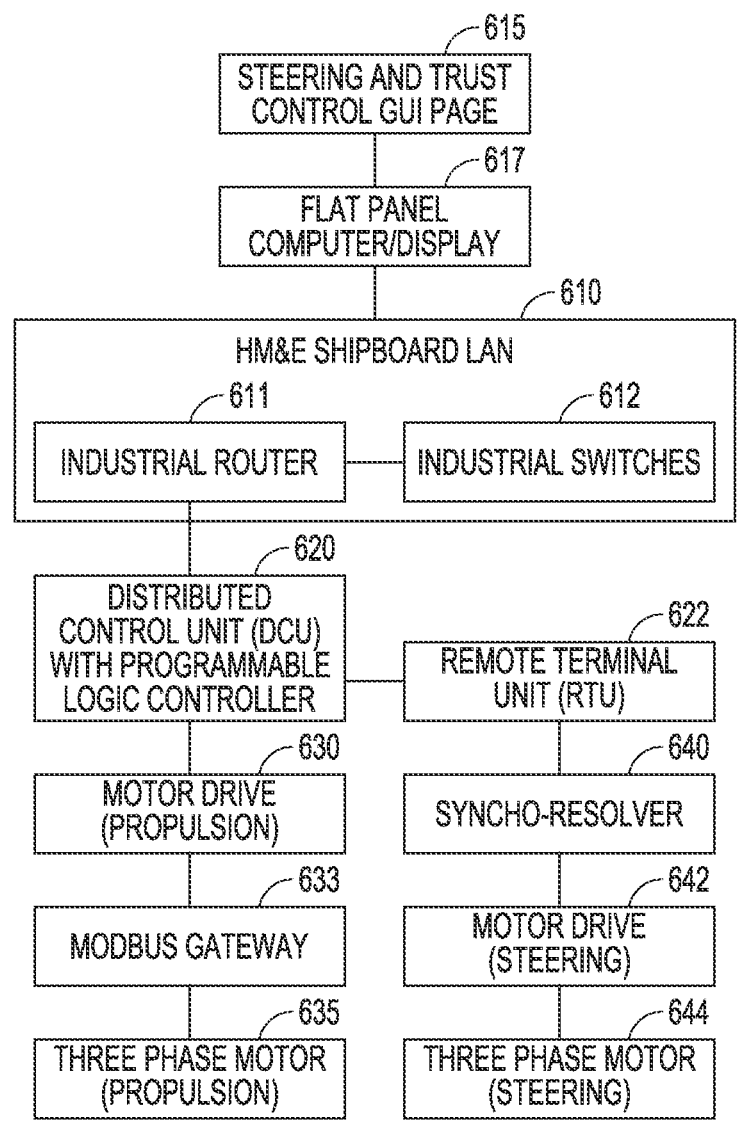
FIG. 6 illustrates, by way of example, a behavior-based approach combining a data aggregation/analytics platform with a firewall and integrating these into a shipboard HM&E network.
Figure 7:
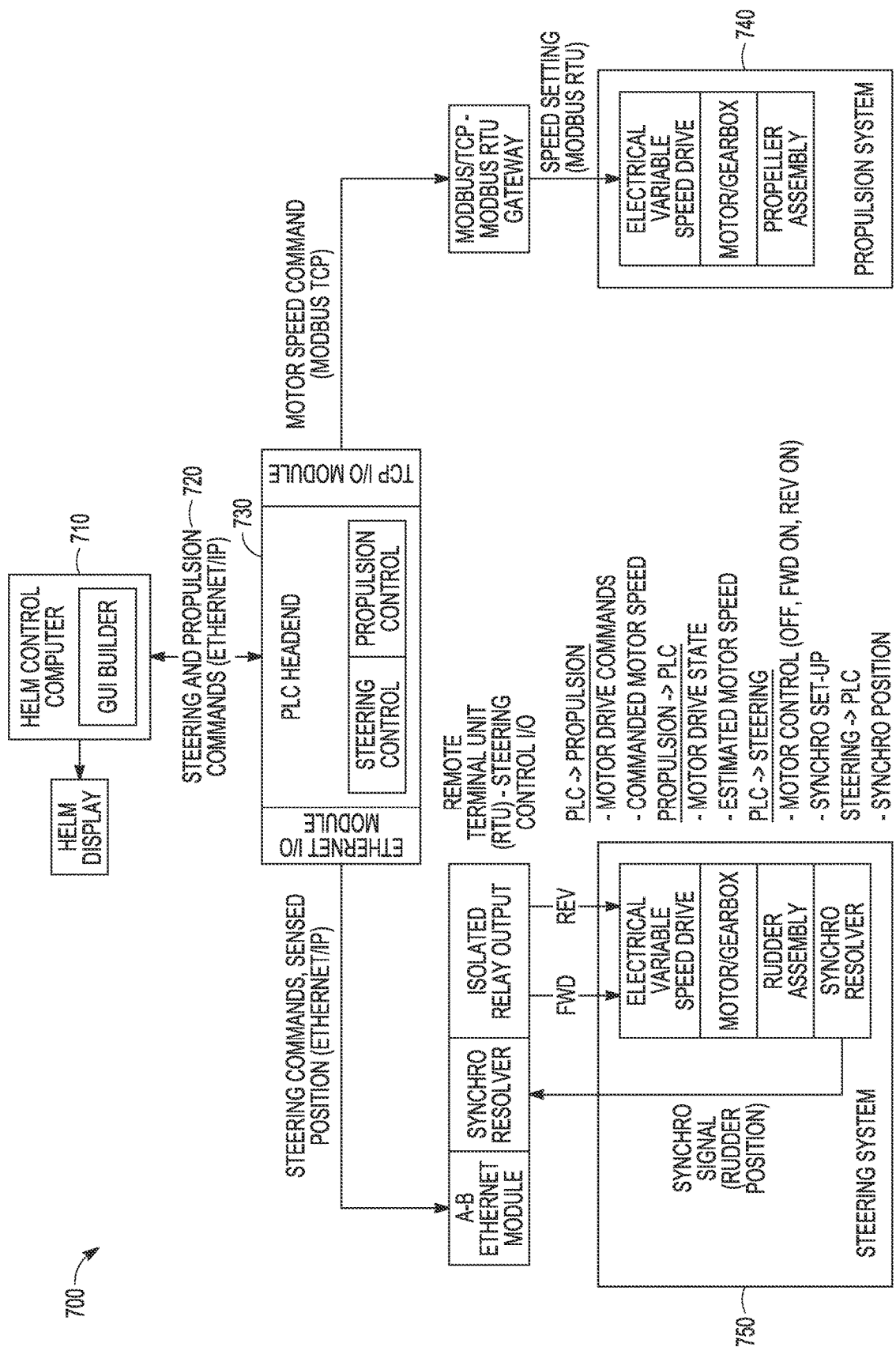
FIG. 7 illustrates, by way of example, a test and evaluation system.

FIG. 6 illustrates, by way of example, a behavior-based approach combining a data aggregation/analytics platform with a firewall and integrating these into a shipboard HM&E network 610. As illustrated in FIG. 6, the shipboard HM&E LAN 610 has access to a steering and trust control GUI page 615 via a computer display 617. The HM&E LAN 610 includes an industrial router 611 and industrial switches 612. The industrial router 611 communicates with a distributed control unit (DCU) 620 with a programmable logic conttoller which in turn communicates with a remote terminal unit (RTU) 622. The DCU 620 controls a first propulsion via motor drive 630 and a second propulsion three phase motor 635 via a Mobius gateway 633. The DCU 620 further controls steering via the RTU 622, a synco resolver 640, a motor drive 642, and a three phase motor 644. FIG. 7 illustrates, by way of example, a test and evaluation system 700. The test system in FIG. 7 is controlled through a helm control computer 710 that sends steering and propulsion commands 720 to a distributed control unit (DCU) 730. The DCU 730 contains a programmable logic controller (PLC) that controls the underlying machinery and sends status back to the helm control. The PLC controls the machinery either through direct connection to an electromechanical interface or through a separate device called an RTU (remote terminal interface) combining both output (effector) and input (sensor) interfaces to the machinery. In the test system the propulsion is based on a direct connection between the PLC and the motor drive controlling the propulsion motor 740 while the steering system uses an WM to control the steering motor 750 and monitor the rudder position.

The test system embodiment has two distinct control flows one for the propeller 810 and another for steering 820. See FIG. 8. Although the control software for both systems is contained within a single ladder logic program running in the PLC, these two flows operate in very different ways and use different protocols to control the machinery. Given these differences, the defensive capability is tailored to operate differently when applied to the steering and propulsion systems. The following paragraphs describe how these control flows operate and details these differences, which are addressed below in the discussion about the hardening capability developed for this system.

Figure 8:
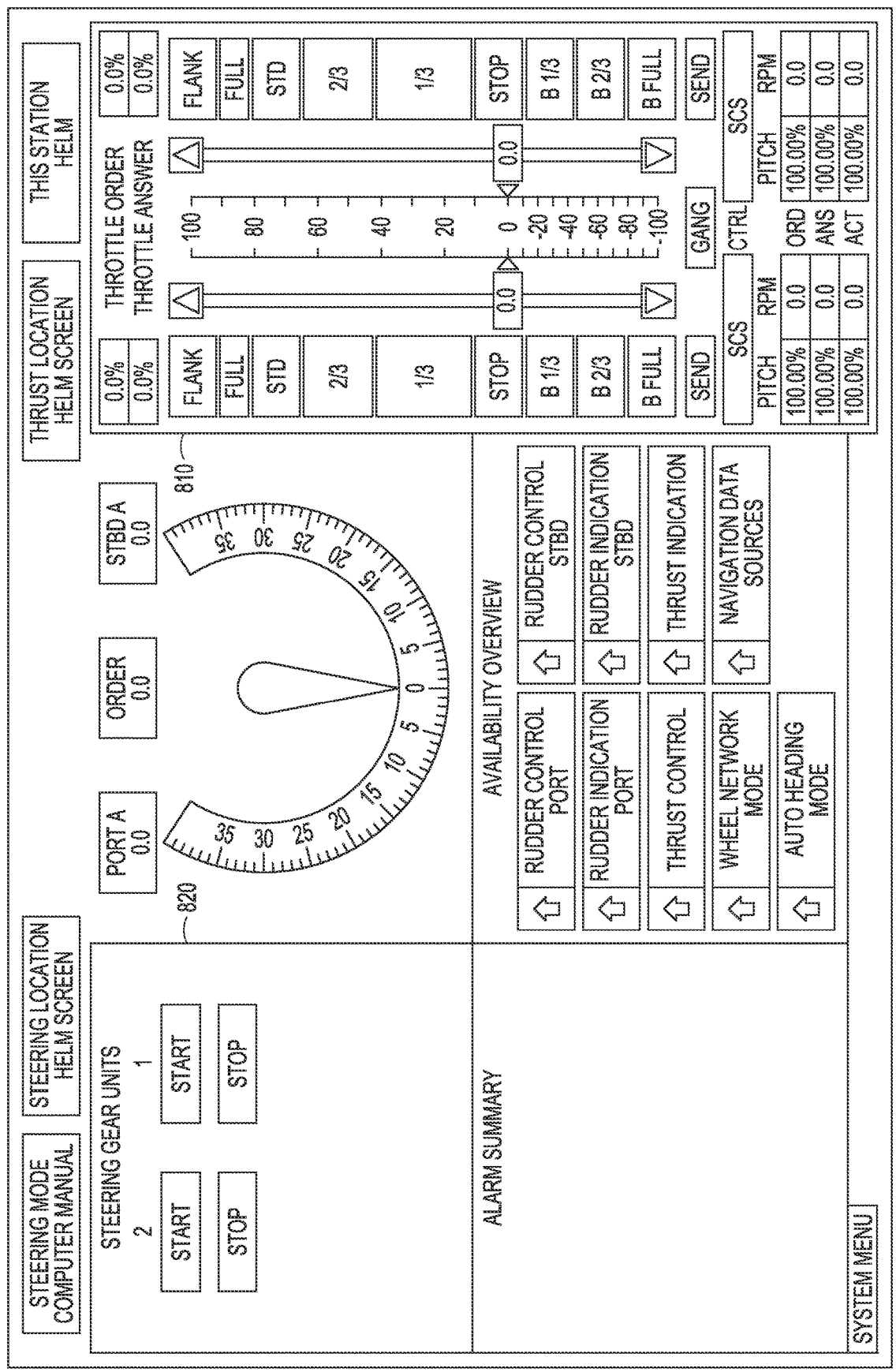
FIG. 8 illustrates, by way of example, two distinct control flows—one for a propeller and another for steering.

The propulsion system, which is shown on the right side of FIG. 8, is built on the industry standard Modbus TCP protocol. When the helm controller sends a new EOT message with the desired speed to the PLC, the ladder logic acknowledges the request and compares the requested speed/direction to the current one. The operator enters the speed through a GUI 900 built from the helm control computer in FIG. 9, which has a non-operational state 910, a ready state 920, and an operational state 930. The GUI provides a total of nine (9) specific speed settings; each speed represents some fractional proportion of the maximum forward or reverse speed available in the system:

Flank Speed Ahead—100% of maximum forward speed
Full Speed Ahead—80% of maximum forward speed
Standard Speed Ahead—60% of maximum forward speed
⅔ Speed Ahead—40% of maximum forward speed
⅓ Speed Ahead—20% of maximum forward speed
Stop
⅓ Speed Back—33% of maximum reverse speed
⅔ Speed Back—67% of maximum reverse speed
Full Speed Back—100% of maximum reverse speed.

The speed selections for the left and right propulsion units are "ganged" together so that a selection of one value for left or right is mirrored on the other side. The test system embodiment only has a single propulsion system with one overall speed setting. The GUI is set up to reflect a typical operational environment where there are two separate propulsion units. The GUI also includes various system status indicators in the lower middle portion of the screen as well as displays describing the commanded and current speeds for the propulsion system.

After the operator selects a speed setting, the operator also selects the SEND button, which causes the PLC to "act" upon the new speed, i.e., to set the answered speed to the commanded speed. The GUI also includes controls to adjust the speed up or down in 1% increments via up or down arrows at the top and bottom of the speed selection bars. The maximum speeds in this system are set by the line frequency of the motor drive (60 Hz), the maximum speed rating or the motor; and the number of poles in the motor (4). This setup allows the motor to go from −1800 RPM (full reverse—clockwise rotation) to +1800 RPM (full forward—counter-clockwise rotation). With the 15:1 gear reduction head attached to the motor this limits the maximum propeller speed to 120 RPM in either direction. The PLC sends status back to the helm control indicating the ordered speed, what the helm operator requested, the answered speed, the speed accepted by the PLC, and the current measured speed, the current motor speed, which is displayed to the operator.

The PLC determines what commands to send to the motor drive based on the differences between the commanded speed and the current speed. The PLC determines how much the current speed needs to be incremented/decremented to reach the new speed value. The PLC then sends a series of messages to change the current speed by small increments.

In this application the PLC adjusts the motor in 0.4 RPM increments at a rate of one update every 50 ms or less. This means that is takes a couple of minutes or more to bring the propeller from a dead stop to full speed. If the requested speed is in a different direction (say from forward to reverse) the PLC software will bring the current speed down to 0 (full stop) and then begin to increment the speed in the opposite direction.

One challenge in this set-up is the need for the PLC software to control the state of the motor drive. When the motor drive is turned on it enters a non-operational "wait state" in FIG. 9. The PLC is required to send the necessary sequence of commands required to bring the motor into an operational state. For this system the PLC sends a sequence of two commands (0x0006 and 0x0007) to bring the motor drive into a fully "ready" state. When in the ready state the motor drive is prepared to power up the motor but does not apply power. To start the motor the PLC sends an operate command to transition the motor drive into the full operational state, at which time the drive applies power to the motor. If the operator orders a stop, the PLC will bring the motor speed down to 0 RPM and then use the shutdown and switch on commands (0x0006 and 0x0007) to put the motor in a ready state while the ship is at rest. These changes in motor state—between operational and ready/standby—suggest a useful context for tracking the propulsion system state as these states will define what types of control data should be sent to the motor.

The actual message traffic between the PLC and the motor drive passes over a Modbus TCP connection from the PLC to a gateway, which then translates the messages into Modbus RTU format for interfacing with the motor drive. This particular instantiation of a propulsion system uses a minimal set of read and write commands over Modbus to control the motor and check its status. In particular the PLC uses a Modbus multiple register write command (Modbus function code 16) to send two sixteen (16) bit data words—the desired motor speed and the drive command. Likewise the PLC uses a Modbus multiple register read command (Modbus function code 3) to read the current motor state and speed as two sixteen bit words. These messages are sent on a continuous rate at least every 50 ms, even if the PLC is not changing the speed or state for the drive. Therefore there is a continuous stream of Modbus read and write commands between the PLC and the drive throughout the entire operation. The PLC will continue to write out a motor command/motor speed message even after the motor has reached its new speed, but it will not have any impact on the motor drive operations until the operator enters a new EOT value at the helm controller. The PLC does not change any of the internal operational parameters of the motor drive (i.e., set points) other than sending the motor drive state command; the drive is preconfigured in terms of maximum speed, etc.

The steering system—which is shown on the left side of FIG. 8 operates differently than the propulsion system. The steering system uses the Ethernet/IP protocol in the connection between the PLC and the RTU to control the steering motor and read back current rudder position. When the helm controller sends a new ROT message with the new rudder angle to the PLC, the ladder logic acknowledges the request and compares the new commanded angle to the current rudder position angle and determines whether it needs to move the rudder to the right or the left and acts accordingly. The operator selects a desired steering angle using the semi-circular angle selection input on the GUI of the attacker laptop shown in FIG. 4; this then defines the ROT (Rudder Order Telegraph) command for steering.

For the steering system the PLC controls the steering system through "two wire" control—in other words, external discrete signals are used to control the motor drive to move the motor in either a forward or reverse direction. When the PLC receives the new ROT command from the helm control it compares the commanded angle to the current angle—if the commanded angle is greater than the current rudder angle then the PLC will command the motor drive to move the motor in the FWD (forward) direction; otherwise, it will move it in the REV (reverse) direction. The PLC also determines when it needs to turn off the motor, which will usually be at a rudder angle that is slightly before the commanded angle. (The rudder continues to "coast" into place for a short period of time after the motor turns off.)

Once the PLC determines the direction in which the motor should turn and the desired "stop" angle, it sends a continuous stream of motor on commands (in FIG. 10, steer right 1010, neutral 1020, and steer left 1030) to the RTU using the Ethernet/IP protocol. These commands are addressed to a relay output board in the RTU, which sends a discrete relay drive signal to the appropriate discrete port (e.g., FWD or REV) on the motor drive. When the command value for a particular discrete value (either FWD or REV) is set to a "1" the output relay drives the discrete input to the motor drive with the appropriate voltage. The PLC continuously sends these commands, in effect defining a rudder "control state" in either a forward or reverse direction, FIG. 10. The RTU also has a synchro-resolver module continuously monitoring the rudder angle from a potentiometer linked to the rudder; the measured angle is sent back continuously to the PLC using the Ethernet/IP connection from the RTU. The PLC monitors this value, and once the measured angle reaches the calculated stop angle it turns off the motor drive by setting the appropriate discrete output (either FWD or REV) to a "0" value, which causes the relay output to drop and turn off the motor. The PLC will continue to send this "off" signal until a new ROT is received.

As mentioned, the connection between the RTU and the DCU uses the Ethernet/IP protocol. The connection from the DCU to the RTU is made using a TCP "forward open" command, but all of the subsequent control messages sent between the two units use UDP on port 2222. The motor drive control sent to the output relay module has two bits for motor control—these are referenced to two of the sixteen outputs on the relay module. These are directly connected to two of the four discrete inputs on the motor drive. The motor drive is set up to operate on two-wire control by default; no additional control is required from the PLC. Either of these two bits is set to move the motor in the FWD or REV directions; if both are cleared then the motor drive turns off the motor. Even when the rudder system is in the "neutral state", i.e., the rudder has reached the last commanded angle, the PLC will continue to issue periodic motor commands with both bits cleared.

The value returned by the synchro-resolver is proportional to the angular displacement of the rudder. This value is returned in an Ethernet/IP message sent from the RTU to the DCU. The angle value is a 12-bit fixed point value; this is converted into an angle by subtracting out an offset value, which represents the 0 degree angle along the center line of the hull, and then dividing by ten. This offset value has to be independently calibrated for each system. Once again the angle is measured periodically and returned to the DCU even when the rudder is not moving.

Figure 11:
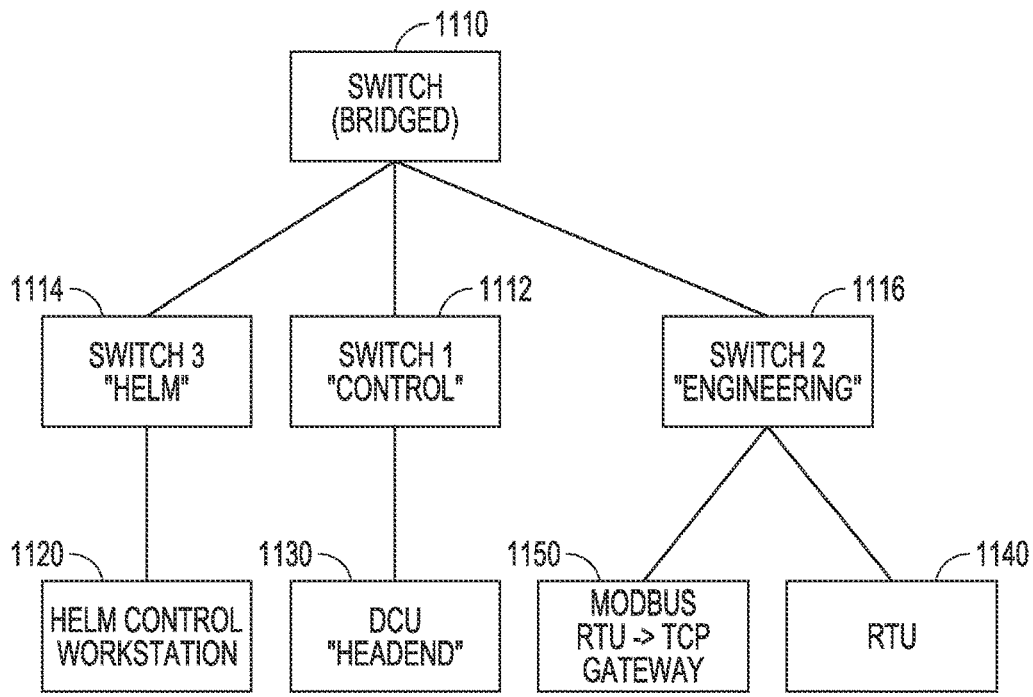
FIG. 11 illustrates, by way of example, a hierarchical network topology.

The helm controller 1120, DCU, RTU, and Modbus gateway are all connected through a standard Ethernet network. Both Modbus TCP 1150 and Ethernet/IP are designed to work across standard Ethernet network components. FIG. 11 illustrates, by way of example, a hierarchical network topology. This system uses a hierarchical network topology, with individual switches 1110, 1112, 1114, and 1116 providing edge access to the various system components like the DCU 1130 and RTU 1140 and a router in the core. For this particular system industrial switches and a router from Moxa were used. Separate VLANs are used to keep the traffic segmented; traffic from the helm control to the DCU is on one of the VLANs; the traffic from the DCU to the RTU and to the Modbus gateway are on two additional VLANs. This topology is an over-simplification of what is actually used on a real ship, which will include some form of Redundant Packet Ring (RPR) protocol to provide higher availability and resiliency to link outages.

Figure 12:
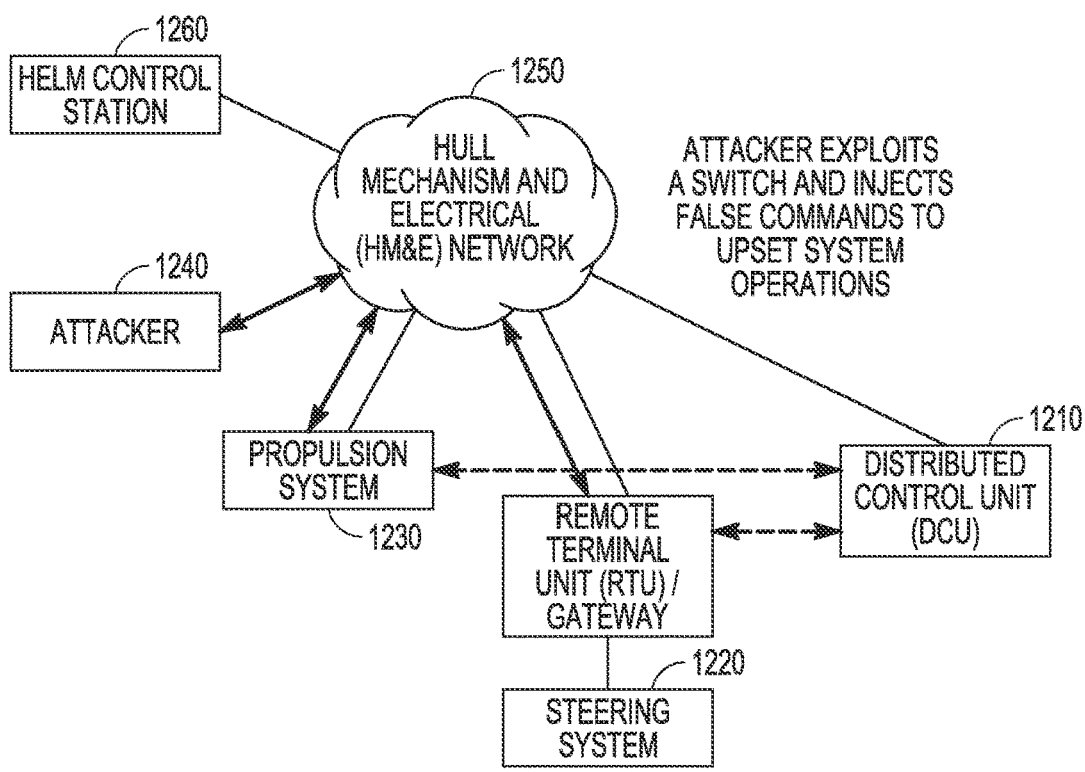
FIG. 12 illustrates, by way of example, an attacker injecting false commands into a system.

Referring to FIG. 12, there are many potential vulnerabilities inherent in a system such as the one described for the test embodiment. Numerous papers have been written about potential attack vectors against PLCs and associated interface modules like the Ethernet modules used in the DCU 1210. Various embodiments focused on system-level vulnerabilities inherent in normal operations of the steering 1220 and propulsion 1230 control loops. In this case, it is assumed that the attacker 1240 gains a foothold in the network via one of many different vectors such as supply chain, insider threat, etc. Once within the network the attacker gains a foothold in the network core, either a router or one of the switches, and uses that foothold to launch an attack via data insertion/deletion/modification for the normal message traffic between the DCU and the motor drives (either directly with the propulsion system or indirectly through the relays for the steering system). FIG. 12 illustrates, by way of example, an attacker injecting false commands into a system 1250, 1260. The attacker could perform a number of potential attacks against the system:

Change the set point of an operational parameter such as the maximum speed supported by the motor drive;

Change the actual operational state of the motor drive by inserting a command that causes the motor drive to enter an unexpected state; or Modify requested parameters such as current speed or motor direction.

In all these cases the attacker is exploiting the lack of highly rigorous fault tolerant programming inherent in these systems as the designers did not expect to have an active source countermanding the normal orders sent by the PLC. It is possible that the program in the PLC will not detect the change in operational state of the system and be unable to return the system to a normal operational state.

Figure 9:
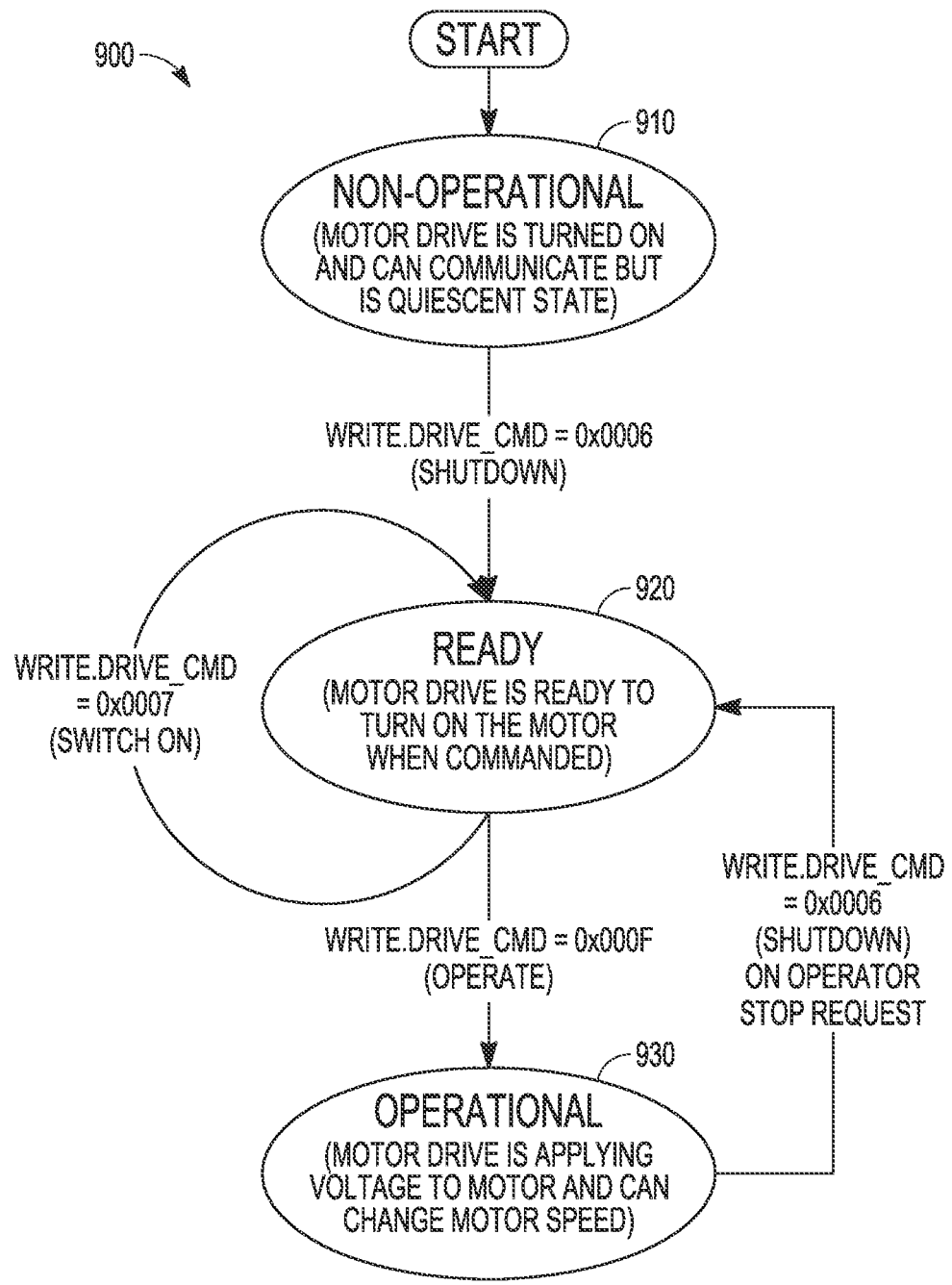
FIG. 9 illustrates, by way of example, a graphical user interface (GUI).

As an example, in testing, a couple of simple attacks against the propulsion system were used to show how vulnerable the system was against these types of attack. The first attack includes the insertion of a "Quick Stop" command that appears to be coming from the DCU to the propulsion system. This command causes the motor drive to go back to a Non-Operational state as shown in FIG. 9. Unfortunately, the PLC still assumes the motor drive is in the Operational state and continues to issue normal commands under that assumption, The PLC program would need to look for the sudden unanticipated change in state to be able to correct this, which is not part of normal practice. This effectively shuts down the propulsion motor, causing the ship to come to a stop. The second attack is also fairly simple—the attacker inserts a message to the motor drive in the steering system that commands the motor drive to change the set point for the maximum motor speed. In tests, a value that was less than 10% of maximum speed was used. Once the attacker sends this message, the propulsion system immediately slows down to a speed equivalent to this new set point. The PLC program has no knowledge of this change and is unable to counteract it without performing a detailed diagnostic routine that queries all of the set points in the system. These attacks—and the system's inability to defend against them—are summarized in TABLE 1.

TABLE 1

| Attack | Defend |
|---|---|
| Propulsion Attack 1: Change Motor Drive State | |
| Attacker monitors commands going to motor drive and waits for it to turn on | Drive treats "quick stop" as normal request even though it is not used for propulsion system operations |
| Attacker inserts "quick stop" message to shut down drive | Drive enters non-operational state and can't be restarted by PLC software |
| Propulsion Attack 2: Change Maximum Speed Set Point in Motor Drive | |
| Attacker detects motor drive type and crafts a message for writing a new set point value to the motor drive | Drive accepts new value without an authorization handshake with PLC PLC limits speed to 10% of maximum as soon as message is received - no feedback of set point value to PLC |
| Attacker writes message to drive and changes the maximum allowed speed set point to 10% of actual value | |

These attacks are predicated on having a "launch point" from the network core.

Given the type of network-level attacks described above, a state-based system-level protection scheme was developed that would:

Monitor/track the system state based on traffic from the helm control and PLC,

Select an appropriate protection policy based on the current state, and

Enforce network-level protections through white-listing based on the policy.

By focusing on system state to drive security policy, the policies may be fine-tuned to be specific to the operations currently being requested from the system. If the user is requesting the propulsion system to speed up or slow down there should be a corresponding policy available that ensures the traffic seen on the network aligns with the types of actions required to change the system speed. The system should also provide alerts for occasions where network traffic indicates unusual behaviors that are not consistent with current operations. We also desired an approach that could be added to existing systems without requiring any changes to the PLC components or programming. Also, any equipment added to the system should ensure that the existing control loops continue to function normally without changing system behavior. This applies to any timing restrictions required for near real-time operations involving command and control (C2) messages sent between the DCU (e.g., with the PLC) and the motor drive/RTU.

Figure 13:
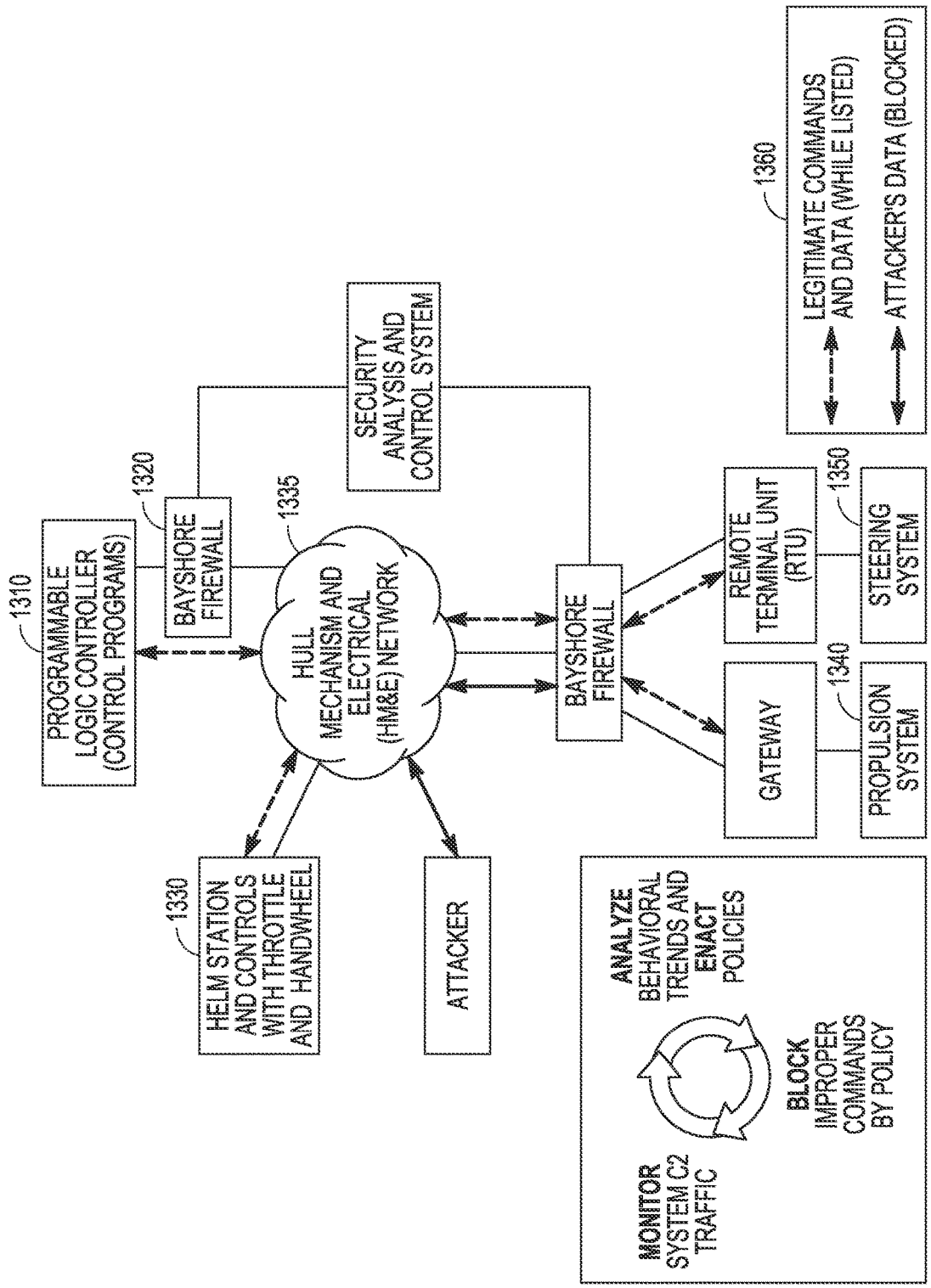
FIG. 13 illustrates, by way of example, a high-level diagram of the resulting system.

Given the restrictions described above, an embodiment uses a two-prong approach for adding in cyber protection to a test system embodiment. The first of these is the integration of a specialized Operational Technology (OT)/Information Technology (IT) technology providing white-list based firewall capabilities having minimal timing impact on the ICS network. The second is a standard data collection, analytics, and reporting "stack" using FOSS software to provide a foundation for any system-level analytics, display, reporting/alerting, and C2 applications. FIG. 13 illustrates, by way of example, a high-level diagram of the resulting system including a programmable logic controller 1310, firewall 1320, HELM station and controls 1330, hull mechanism and electrical network 1335, propulsion system 1340, steering system 1350, and legitimate commands and attacker data 1360.

The firewall device is a specialized gateway between information technology (IT) and operation technology (OT) systems. It provides deep packet inspection for a large number of industrial protocols and enforces security policies against every packet being transmitted through the gateway. It is optimized to perform this function with minimal latency to prevent any impacts on the tight timing constraints of industrial control loops. It supports highly granular content inspection at the application layer (Layer 7) and at the link layer (Layer 2), to include individual fields within the industrial protocol. Within the hardened system, it supports OT firewall functions by inspecting and "white listing" packet traffic passing between the individual components such as the DCU or RTU and the network core. The firewall device consists of two main components—multiple application firewall instances, which provide the actual policy enforcement within the network, and an instance providing the management layer for all of the application firewall instances.

The use of multiple ICS firewall instances or an ICS firewall that supports multiple transparent bridge port pairs is driven by the need to enforce distinct policies between the helm control and DCU, the DCU and RTU, and the RTU and downstream ICS devices. In order to accomplish this level of policy customization, one firewall transparent bridge port pair can be assigned per path. Protocol specific network flows can be created for each ICS firewall transparent bridge to forward the Modbus and Ethernet/IP ICS protocol message traffic. Each network flow gets assigned a policy defining the specific rules that should be enforced by the application firewall on the traffic flowing on the given port pair.

The firewall's policies are made up of includes, conditions, and rules. An include is a reference to another policy to be included in the current policy and allows for breaking policies up into smaller modular units. Conditions can check different aspects of different layers of the message such as source or destination address or port, data item identifiers, and data item values. Rules perform actions such as deny the message, report message data, or set variable values. For each defined ICS protocol the dynamic policy engine creates a main policy for a route to allow the specific protocol and includes the other generated policies that enforce the models. These include simple modular policies to set variables and log data item values along with more complex policies which restrict messages to the defined configuration and which enforce the data model. The policy to restrict messages to the defined configuration checks that each message meets criteria of the defined configuration in that it is performing a valid function or service for the defined data item identifiers and that the originating source for the data item is in a defined whitelist of valid message originators for commanding or statusing the data item. The policies to restrict messages to the defined data model check that each message has a valid value for the data item and that the value meets criteria defined for transitioning to that value. It also performs any defined actions, such as modifying state variables, specified for the data item or actions specified for specific values. The criteria for transitioning to a value can include checks that the transition is changing from a value defined to be valid for the transition or that other state variables are in a specified list of valid states.

Specific policies can be designed to address the two types of attacks described above. The first one involves an attacker issuing a Modbus QuickStop command to change the motor state to stop the propulsion system. This attack is stopped by employing specific application firewall policies. The first level of defense is that the DCU whitelist only allows commanding of the propulsion motor from the DCU at a particular IP address. A policy restricting Modbus messages to the system's defined configuration will block all commanding of the propulsion motor from any other address. The quick stop command is not valid for normal "under way" ship operations as defined by the message traffic generated by the helm control. Therefore, a policy is defined that prohibits the use of the QuickStop command value within the specific DesiredMotorState data item (e.g., the specific motor command sent from the DCU to the motor drive during the Modbus write operation). When a QuickStop command (value=2) is encountered during a Modbus write operation to the motor state at a specific register, the application firewall blocks that write operation according to the policy that enforces the DesiredMotorState data model because the value of 2 is not in the list of allowed values. (The other values shown in the diagram in FIG. 5—such as 6. 7, and 8—would be on the "allow" list and are passed through to the propulsion system with no modification.)

For the second cyberattack, an attacker could change the maximum RPM setpoint in the PLC to a very low value. The attacker could do this by inserting a Modbus write message to the specific register in the motor drive controlling the maximum speed the motor drive will use to drive the motor. (The speed is controlled by the frequency of the three-phase AC power signals the motor drive sends to the motor, so this set point determines the maximum frequency the motor drive will output to the drive.) With a propeller running at full speed this immediately reduces the prop speed to a significantly lower speed (<10% of the maximum in our tests). The max RPM set point value can be at a particular Modbus register. There is no operational reason to change the rated maximum motor speeds of the turbines in the propulsion system during normal operational conditions, so this action represents an anomalous command indicating a possible attack. The attack is stopped by a policy restricting Modbus activity to the model's defined configuration, which is limited to Modbus writes to specific registers (motor state commands and current RPM settings). If a register is not part of the ship's defined configuration, writing to that register that is not defined in the policy is blocked by the application firewall. The resulting attack/defense actions are summarized below in Table 2.

TABLE 2

| Attack | Defend |
|---|---|
| Propulsion Attack 1: Change Motor Drive State | |
| Attacker monitors commands going to motor drive and waits for it to turn on | Protected system determines that propulsion control loop is functioning in normal "under way" operations and enacts specific policy to limit the values that can be written in the command message to change state |
| Attacker inserts "quick stop" message to shut down drive | Bayshore SingleKey detects attacker's use of a specific command value that is not allowed (QuickStop) and blocks it |
| Propulsion Attack 2: Change Maximum Speed Set Point in Motor Drive | |
| Attacker detects motor drive type and crafts a message for writing a new set point value to the motor drive | Protected system enacts specific policy to limit what registers can be accessed in the propulsion motor drive when ship is "under way" |
| Attacker writes message to drive and changes the maximum allowed speed set point to 10% of actual value | Bayshore SingleKey detects attacker's attempt to write to one of these unauthorized registers and blocks the message |

Figure 10:
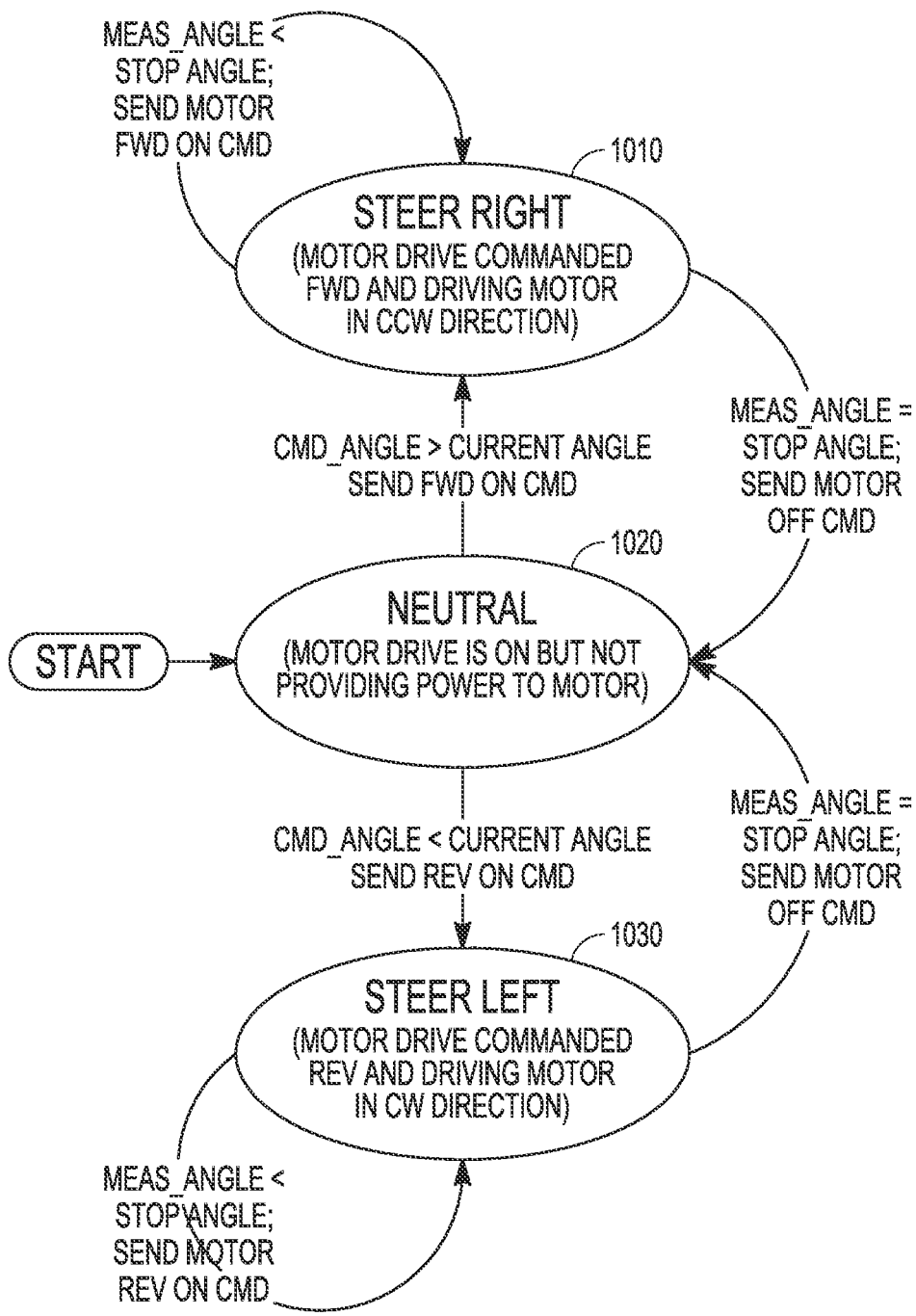
FIG. 10 illustrates, by way of example, a rudder state diagram.

Potential attacks against the steering system and possible mitigations include:

Insertion of steering motor "on" messages to turn on steering when no command has been given by the helm. In this case the rudder is at its correct position and the helm operator has not entered a new steering command. The protected system can monitor the commands coming from the helm and track the steering system state as shown in FIG. 10. Since the commanded steering state has not changed the commanded angle the system should stay in the NEUTRAL state. The system could enact an application firewall policy to suppress any motor commands until the helm control issues a new ROT.

Insertion of alternate "on" commands (REV or FWD) when the steering system is moving in the opposite direction (FWD or REV). In this case the attacker attempts to force the motor in the opposite direction of travel by sending commands where the wrong motor direction is given, The output relay in the RTU would then toggle the motor discrete controls between FWD and REV, causing the rudder to "wiggle" back and forth. One possible approach to stop this is to force a policy where the system tracks the state (turn right or turn left) and ensures that only the appropriate motor on command is allowed to be sent to the RTU.

In a modification of the returned angle value, the attacker attempts to change the value inserted in the returned rudder angle measurement message from the synchro-resolver. This is a more subtle attack. There could be an addition of math-based policies to the application firewall, which would allow the system to track the rate of change in rudder angle. By detecting a sudden deviation in this rate, the system may be able to determine that the returned message was modified.

A complete ICS intrusion detection system (IDS) combines the application firewall capabilities with an analytics backend. The analytics backend provides the operator interfaces and controls the application firewall components. The analytics backend can communicate with the application firewall over two interfaces. The first is through a capability of the application firewall to forward its policy logging to one or more remote syslog server ports. This interface is utilized to forward control and status message content captured by deep packet inspection rules which provides insight into system commanding and state. It is also used to forward policy violation information from the application firewall to the analytics software to alert operators via an alert GUI. Another interface is through a RESTful API provided by the application firewall. The analysis system uses this http interface to upload XML-based policies that govern each route that it created from its XML data models of the ship's control systems.

The XML files contain a detailed state model that incorporates not only the data associated with the behavioral models shown in FIGS. 5 and 6, but also many of the other key configuration data for the system. For instance, the PropulsionModel file includes:

Details on each helm control propulsion setting, to include the equivalent RPM value The maximum and minimum speed values associated with the motor The allowable motor states (see FIG. 5) and their associated data values as provided by the motor drive.

The expected values for the motor state command messages that should be received in each state and the associated allowable transitions to another state.

There is also a PropulsionSystemConfiguration file containing critical network data such as allowable port numbers, IP source addresses, and critical Modbus data such as allowed register values defining the actual writable Modbus registers that can be accessed for a given system.

The application firewall, in an embodiment, provides a web based GUI to support configuration of internal routing from an external source. The application firewall GUI provides screens to create OSI layer 2 (link layer), OSI layer 3 (network layer) and layer 7 (application layer) network routes. In an embodiment, Layer 7 routes can be created for each protocol-specific control path. Each path defines specific forwarding configurations for each type of protocol message to include specific destinations (by IP address) on specific ports (by port number). These forwarding paths can be set up either as a transparent bridge or as a bridge between two subnets. These routes are then passed through the application firewall instance, which inspects each packet flowing through the route and applies a route-specific policy to the messages. In an embodiment, protocol-specific Layer 2 network flows can be created for each transparent bridge port pair. Each network flow defines a port number or port range for which to execute a specific policy. These flows are then monitored by the application firewall instance, which inspects each packet flowing through the port pair and applies a protocol-specific policy to the messages.

Cyber Analytics System

Figure 14:
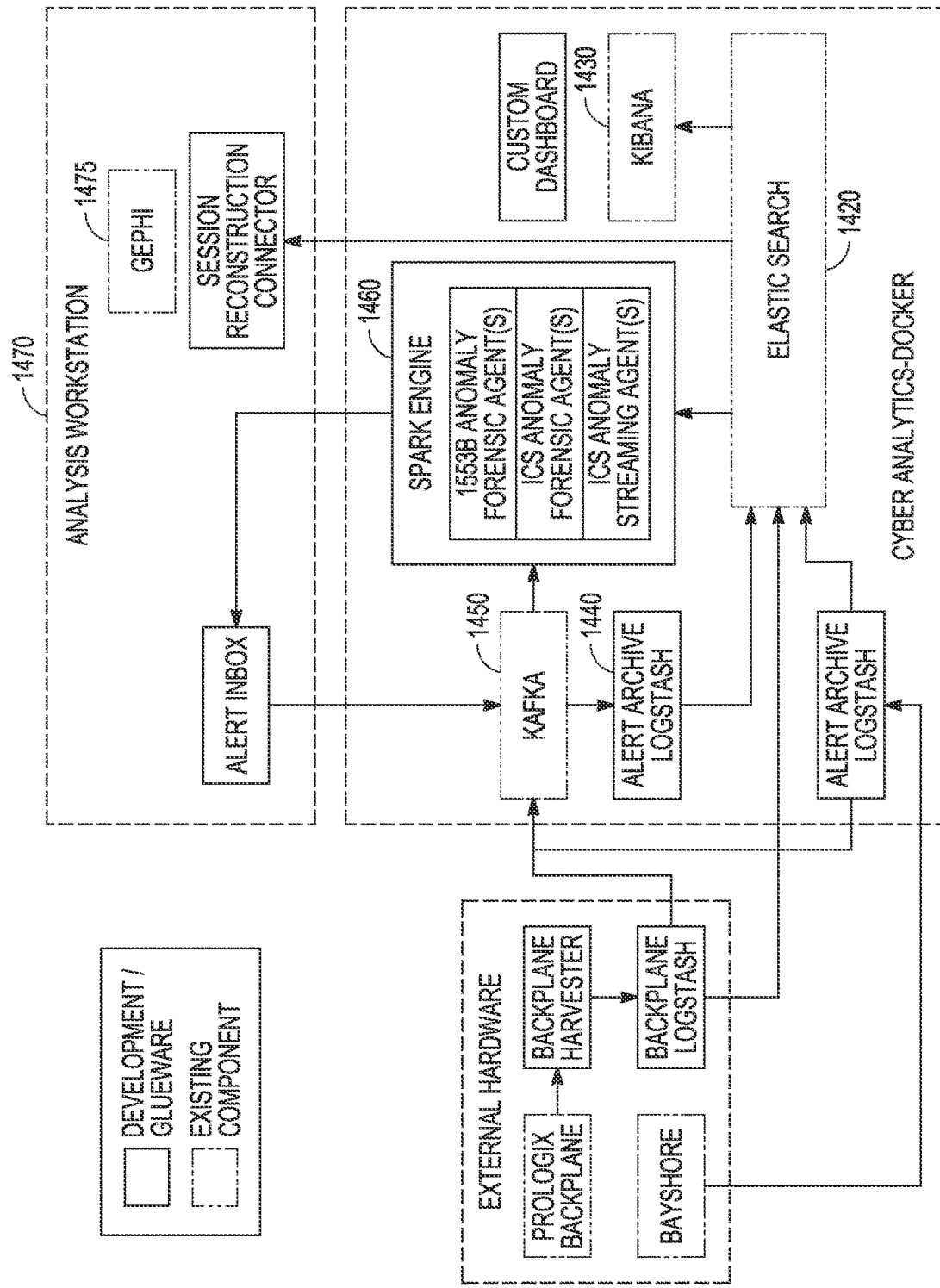
FIG. 14 illustrates, by way of example, an exemplary system.

The other major part of the ICS IDS is the cyber analytics system (CAS), which can be installed in another server. CAS is built on a combination of FOSS (Free and Open Source Software) combining an underlying data management framework with added event detection/correlation and visual analytics tools (FIG. 14). The data management framework is based on the ELK stack comprised of ElasticSearch 1420, Kibana 1430 and Logstash 1440. This provides a centralized logging and historical cataloging facility for the secured ICS system. The analytics infrastructure incorporates streaming anomaly detection and event correlation analytics using Apache Kafka 1450 and Spark 1460. The system also incorporates a data analysis interface 1470 for the operator that uses Gephi 1475 for visual analytics, which enables the operators to visualize data flows and other operations. A set of specialized agents, connectors, and dashboards can support the specific operations of the shipboard ICS system and can be integrated onto the underlying framework.

Data flow within the analytics system is fairly straightforward. The main connection between the application firewall instances and Logstash is provided by an input filter, which takes data output by the rsyslog forwarding mechanism in the application firewall. An output filter provides the main data access point for all analytics and operator interfaces.

Once data is available, it can be discovered on demand using a dashboard, or exported using an ICS session reconstruction connector. Basic dashboards can track the Modbus message traffic for the propulsion system and detect changes in the commands.

An ICS IDS capability extends an alerting application. The ICS IDS contains a dynamic policy engine. The dynamic policy engine converts an XML data model of the industrial control systems into application firewall policies that restrict control loop messaging to values and state transitions defined within the model and alerts on anything outside of the model's operating envelope. The dynamic policy engine creates and uploads the initial static policies created from the model on initialization and then can upload dynamic policies in reaction to real time system state transitions. The system can employ the application firewall as a sensor for specific event types by developing "alert only" policies that send alerts, thus allowing the analytics capability to monitor real-time operations such as new EOT and ROT messages generated by helm control.

The analytics infrastructure also includes a separate mechanism for collecting data from the backplane in the DCU. An Ethernet module in the DCU chassis can be used as a device for passively collecting bus transactions. The driving requirement here was to monitor interactions on the bus to see if sensor or command data being received from or sent to one of the internal modules has been modified somewhere within the interface or processor modules. The end goal is to identify potentially anomalous behavior in the DCU or RTU chassis either based on internal patterns as well as by correlation of bus traffic with external network events. These data are captured on an analysis workstation directly connected to an ethernet controller over a USB cable using a Python script, and then routed through the system using a "standard input" filter.

The underlying policy enforcement function inside the application firewall makes use of Deep Packet Inspection (DPI) functionality to look at specific fields within the message traffic to detect policy violations. The application firewall's DPI capability is "protocol aware"; in other words, it understands the contents of the underlying protocol and can process each message according to the specific fields within the protocol. For instance, a Modbus over TCP message has a very specific layout with identifiers for reading and writing data from/to one or more addresses. Using DPI, the application firewall can detect what is being written to a specific device and where it is being written. The addresses used often correspond to specific components or control variables within a device; therefore, the address will indicate an attempt to modify a specific operational parameter—such as the current RPM setting for the motor drive controlling the propulsion system. RDG generates policy sets restricting what can be written to these parameters based on the state of the system, and application firewall enforces these policies by reading and decoding the messages and filtering (e.g., blocking) any message whose contents fall outside of the stated policy. This is known as "whitelisting"—only messages with correct contents are allowed to pass through the system. Policies also include restrictions on the source and destination addresses for a message, so that specific message types—such as an RPM setting for the motor—can be restricted to messages originating from a given endpoint (such as the DCU).

Although this approach supports the majority of policies required to protect the underlying ICS system, it lacks a key ability to implement dynamic policies involving the actual command parameters being used to control the system. An attacker may be able to spoof many critical fields that are checked by the policy, such as the source address. They could then alter shipboard operations by issuing a string of commands to cause sudden changes in an operational parameter like the RPM setting. If the attacker does this when the ICS subsystem is in state where RPM changes are expected (such as when a change in speed command [Engine Order Telegraph] is issued by helm control), the system would not be able to block the message.

To address this issue, math functions within the policy set can be implemented, which adds a capability to enable the blocking mechanism to use a mathematical expression containing addition, subtract, multiplication, division, and modulo to a specific attribute in a rule. The "attribute" is the value used to check the contents of a specific field in the message. This enables the system to enforce rules against operational parameters to ensure that those parameters fall within a range of values to protect the ICS system. For instance, a policy can restrict the range of RPM values for an increase of speed to a minimum/maximum range; even if the attacker spoofs the message, the attacker cannot force the motor to go beyond the established limits. This change required the addition of a new "value encoding" attribute within the policy to distinguish these new math-based attributes from standard state variables, which only check to see if the given filed matches a specific value (e.g., the default rule check used in the basic system).

The dynamic policy engine is used to convert XML models of an ICS to firewall policies. Generated ICS cyber security policies wrap the defined systems' network interactions in a protective shroud that enforces the defined models, prevents ICS protocol operations outside of the defined models, and alerts on violations of the policies. In addition, the dynamic policy engine, uploads ICS protocol based security policies to the appropriate network paths on one or more ICS firewalls. The execution of cyber security policies may be monitored. Upon a detection of a violations of cyber security policy rules, the dynamic policy engine may:

forward alerts to external alerting system
    allow other systems to handle alerting duties
    use cyber security policies to drive deep packet inspection and the state extracted by the ICS firewall
    react to state transitions and upload modified policies
    forward state information to an external state display
    allow other systems to handle display of state information
    Industrial Control Systems and their component's operating constraints and behavior are defined in XML configuration. Firewall configuration associates ICS protocols and policy names to application firewall network flows. Modular system configurations define components and their data items' ICS protocol, identifiers, and access controls. Modular system models define components' data items' valid values and violation action (deny, report):
    enumerations or ranges value transitions
state machine elements
　Infer elements can set state variables, generate violations, or block messages
　　When elements can specify state variable value requirements to execute the parent element
　　Can include mathematical operations Cyber security policies may be generated from defined system models. Defining of the systems' components' data items results in policies that prevent any ICS protocol operation references outside of the defined components and results in policies that prevent any ICS protocol operations not defined as valid for the defined components.

Defining the systems' components' data items' valid discrete values or range results or value transitions in policies that block and/or alert when a valid ICS protocol operation of a defined component contains an invalid value. This reduces cyber vulnerability exposure to mainly attack vectors that are interface spec/ICD compliant and stifles attempts to inject invalid content into the system to damage components by commanding to out of spec values.

Defining the systems' components' data items' valid value transitions depends on state and uses embedded state machine elements and results in policies that block and/or alert when a valid ICS protocol operation of a defined component contains a valid value but the condition does not meet the value transition criteria. Discrete values of an enumeration add one or more "When" sub-elements to an "AllowedValue" element to specify valid conditions for the "AllowedValue". When elements contain: state variable reference; math or set operation such as "=" or "in"; or Literal value or state variable reference.

Range allows "AllowedDelta" sub-element to specify how far and optionally in which direction an integer value can move from the previous value.

Defining state machine elements results in policies that set and reference state variables to enforce the defined state machine. This reduces cyber vulnerability exposure to mainly attack vectors with intimate knowledge of current states of the systems and intimate knowledge of valid system behavior and stifles attempts to inject valid commands at invalid times and now enforces valid context within and between one or more defined systems.

State machine elements can be added to any data item to set state variables, force a violation, or force the blocking of a message. A "CreateVariable" element can set a state variable to the data item's value. An "Infer" elements can set state variables to literal values or other state variables. Include "When" sub-elements to specify a condition for when to execute the infer operation. The specified result can include math operations. Example: <Infer>$count=$count+1</Infer>

"Infer" elements can force violations or block messages. Many begin with a "Violation:" or "Block:" directive. These elements can contain an optional wait counter to delay directive execution until the "When" condition has persisted for n times.

Defining the components' data items (protocol, identifiers, access operation, source whitelist) within one or more ICS systems generates policy rules that block and/or alert on any protocol operations or references not defined as valid within the model and reduces cyber vulnerability exposure to mainly attack vectors related to defined items. This also stifles fuzzing attempts and hackers without privileged knowledge of system and protects static set-points of industrial control equipment.

In various embodiments, XML system definition files are the root of the policy deployment chain. Application firewall configuration is controllable via a set of modular XML files. The XML files may be augmented with properties file for configurable data such as application firewall ICS firewall IP addresses and commanding source whitelists containing valid source IP addresses. The dynamic policy engine uploads the multiple different generated ICS protocol-based policies to the correct network paths (transparent bridges) on one or more ICS firewall appliances. System model XML may define one or more network paths that a component's protocol messages will traverse. System model XML and generated ICS firewall policies are modular. Policies for specific network paths include only the policy rules that apply. Definition of the entire system and its configuration may be contained in the system model XML.

ICS Firewall policy files are generated from system definition files on application startup or when state transition action is defined to modify a policy dynamically.

ICS Firewall policy files are dynamically deployed to ICS firewalls. A warmstart option prevents uploading generated policies on application startup. ICS firewall policies are uploaded to appropriate network flows on ICS firewall instances, which are uploaded using an http API. ICS protocol-based policies are uploaded to one or more protocol-based network flows. Network flow is a named network control defined on the application firewall appliance specifying an ICS protocol and a port or port range for an application firewall transparent bridge/port pair to which a policy can be attached for execution when a protocol message passes through the bridge and uploaded to one or multiple ICS firewalls. Information about which policy names get applied to which network flows on which ICS firewall instances is contained in the system definition files.

The dynamic policy engine monitors execution of the ICS firewall output streams containing logging of policy execution. ICS security policy rule violations are built into policies to encode relevant information into available policy XML, attributes to identify the data item and reason for violation. They have a configurable capability to forward violation to an external alerting system.

Data item logging rules are built into policies to encode data item identifier with its value. They have a configurable capability to forward state information to an external system.

A reactive policy generation relates to a data item value state transitions which can trigger dynamic policy changes and which are uploaded to all relevant network flows.

The use of mathematical expressions can also require an update to the rules engine. As described above, the rules now incorporate value attributes for both standard variables as well as the new mathematical expressions as defined by the "value encoding" attribute. In addition, a mechanism exists in the dynamic policy engine to build policies to track "delta values between individual commands within a command sequence to allow the system to control the rate at which an operational parameter is allowed to change using the math functions. In this particular situation, the messages used to increase the RPM of the propulsion motor are checked to see if the requested RPM changed more than a specified value between each message. This enables the system to enforce rules that "throttle" the rate of change of critical operational parameters. In the real world the rate of change of the propeller speed is carefully managed based on the hydrodynamic restrictions that water places on the propeller(s) on the ship—the rate of rotation change is limited by the water's resistance. Therefore, the rules can enforce these known physical limits to prevent an attacker from trying to make radical changes that could impact system operations.

Figure 15A:
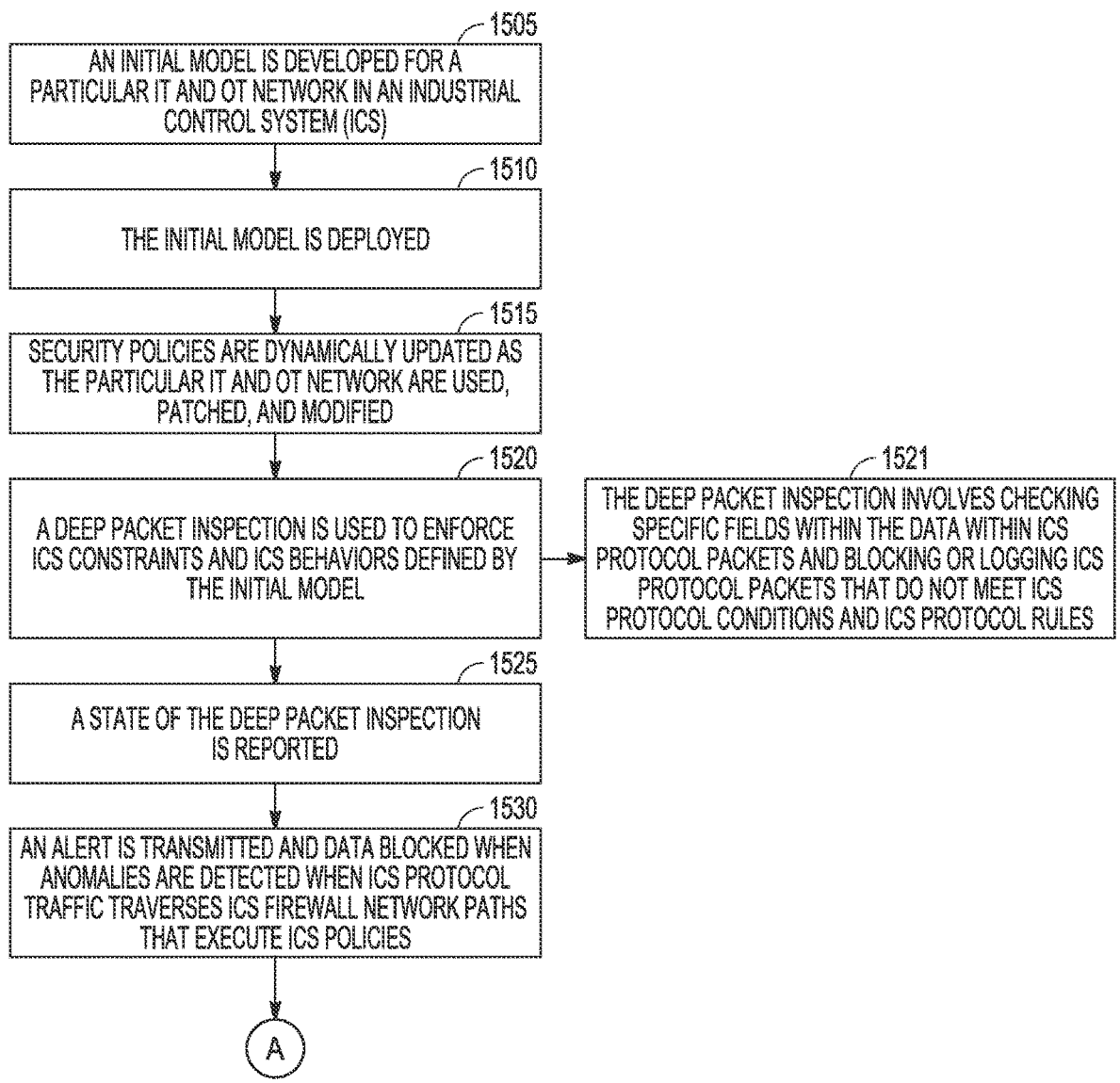
FIGS. 15A and 15B illustrate, by way of example, operations and features of a process to detect cyber anomalies in an industrial control system.
Figure 15B:
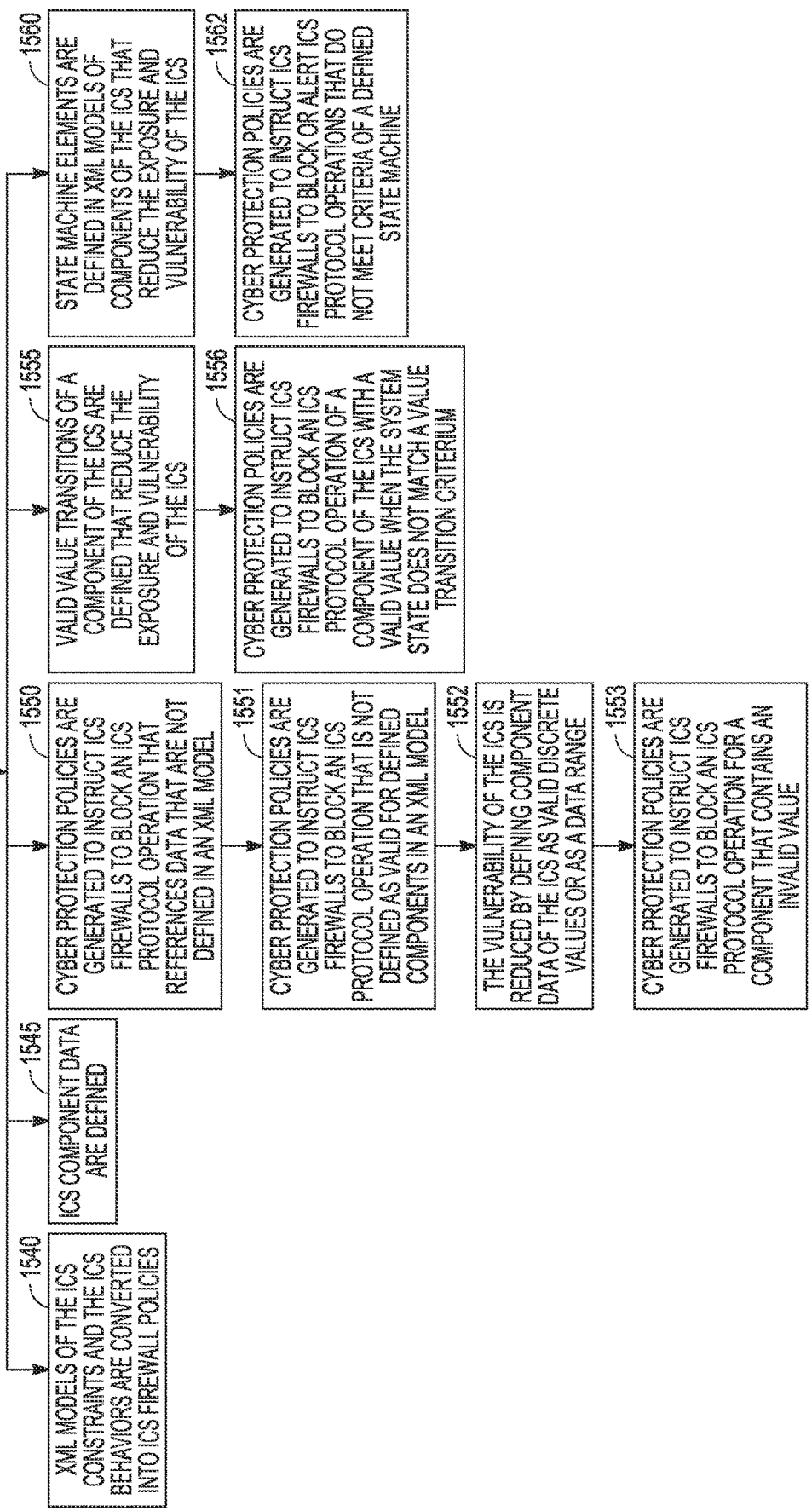

FIGS. 15A and 15B illustrate, by way of example, operations and features of a process to detect cyber anomalies in an industrial control system and operations and features of a process for providing security for information technology (IT) and operational technology (OT) networks associated with an industrial control system (ICS). These operations and features can be referred to as a cyber-hardening of such ICS systems. FIGS. 15A and 15B include process blocks 1505-1562. Though arranged substantially serially in the example of FIGS. 15A and 15B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 15A and 15B, at 1505, an initial model is developed for a particular IT and OT network in an industrial control system (ICS), and at 1510, that initial model is deployed. The ICS communicates via ICS protocols. At 1515, security policies are dynamically updated as the particular IT and OT network are used, patched, and modified. At 1520, a deep packet inspection is used to enforce ICS constraints and ICS behaviors defined by the initial model. As noted at 1521, the deep packet inspection involves checking specific fields within the data within ICS protocol packets and blocking or logging ICS protocol packets that do not meet ICS protocol conditions and ICS protocol rules. At 1525, a state of the deep packet inspection is reported. The state of the deep packet inspection is used for situational awareness and debugging purposes. At 1530, an alert is transmitted when anomalies are detected when ICS protocol traffic traverses ICS firewall network paths that execute ICS policies. Transmission of the offending data is also blocked.

At 1540, XML models of the ICS constraints and the ICS behaviors are converted into ICS firewall policies. These ICS firewall policies are made up of rules and conditions to check and enforce the ICS constraints and the ICS behaviors of the XML, models. These ICS firewall policies are further associated with ICS protocol network paths and are uploaded to the appropriate ICS firewalls and are attached to the appropriate ICS firewall network paths. At 1545, ICS component data are defined. The ability to precisely define such component data reduces the exposure and vulnerability of the ICS.

As indicated at 1550, cyber protection policies are generated. These cyber security policies instruct the ICS firewalls to block an ICS protocol operation that references data that are not defined in an XML model. The security policies also transmit an alert regarding the blocking. Similarly, at 1551, cyber protection policies are generated. These cyber protection policies instruct the ICS firewalls to block an ICS protocol operation that is not defined as valid for defined components in an XML model. These protection policies also transmit an alert regarding the blocking. As indicated at 1552, the vulnerability of the ICS is reduced by defining component data of the ICS as valid discrete values or as a data range. Further, at 1553, cyber protection policies are generated. These cyber protection policies instruct ICS firewalls to block an ICS protocol operation for a component that contains an invalid value. These cyber protection policies further transmit an alert regarding the blocking.

At 1555, valid value transitions of a component of the ICS are defined. These valid value transitions reduce the exposure and vulnerability of the ICS. At 1556, cyber protection policies are generated. These cyber protection policies instruct ICS firewalls to block an ICS protocol operation of a component of the ICS with a valid value when the system state does not match a value transition criterium. The policies also transmit an alert regarding the blocking.

At 1560, state machine elements are defined in XML, models of components of the ICS. This definition of state machine elements reduces the exposure and vulnerability of the ICS. At 1562, cyber protection policies are generated. These cyber protection policies instruct the ICS firewalls to block or alert ICS protocol operations that do not meet criteria of a defined state machine.

Figure 16:
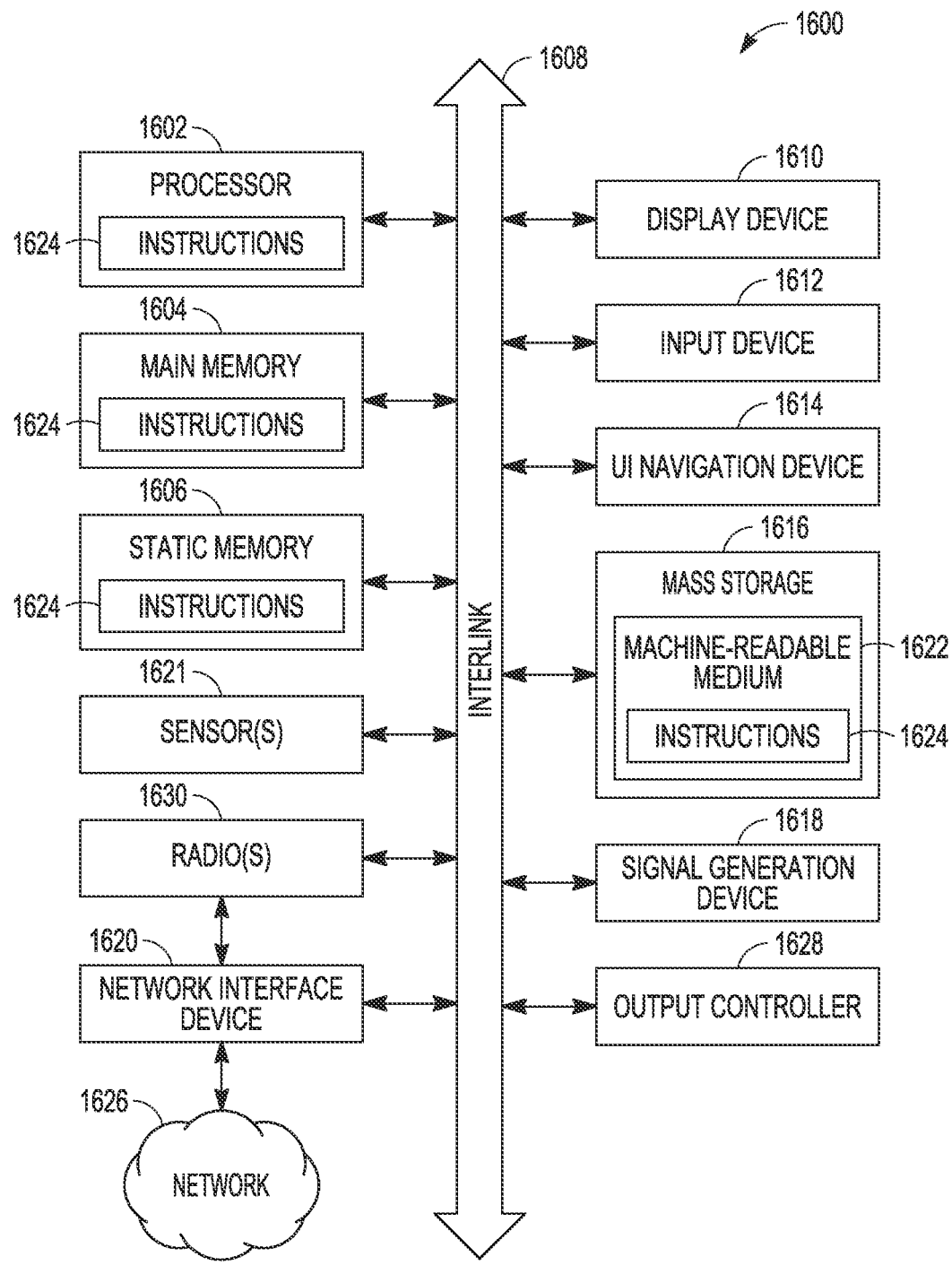
FIG. 16 illustrates, by way of example, a block diagram of an embodiment of a machine on which one or more of the methods, such as those discussed herein, can be implemented.

FIG. 16 illustrates, by way of example, a block diagram of an embodiment of a machine in the example form of a computer system 400 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a mass storage unit 1616, a signal generation device 1618 (e.g., a speaker), a network interface device 1620, and radios 1630 such as Bluetooth, WWAN, WLAN, and NFC, permitting the application of security controls on such protocols. The example computer system 1600 also includes sensors 1621.

The mass storage unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   one or more Industrial Control System (ICS) firewall hardware processors in a data network, the ICS firewall hardware processors operable to execute a deep packet inspection among a plurality of ICS systems or among components of an industrial system that use ICS protocols; and
   a dynamic policy engine hardware processor comprising a model of the ICS firewall hardware processors and of ICS component data, the dynamic policy engine hardware processor operable to process ICS protocol network traffic;
   wherein the dynamic policy engine hardware processor comprises cyber security policies that block the ICS protocol network traffic or transmit an alert when the ICS protocol network traffic traverses an ICS firewall network path that is not defined as a valid data item of a system component;
   wherein the dynamic policy engine hardware processor uploads ICS protocol-based policies to each ICS firewall network path, wherein the ICS firewall hardware processors are operable to execute policy rules utilizing the deep packet inspection to validate a data value or value transition of a defined data item;
   wherein the industrial system comprises a shipboard hull, mechanical, and electrical (HM&E) system;
   wherein the dynamic policy engine hardware processor monitors an output stream of the ICS firewall hardware processors to output alerts when the cyber security policies are violated and to output data item state information when policy logging rules are executed;
   wherein the output stream of the ICS firewall processors indicates an attack to a motor system to stop a propulsion system of the HM&E system and the attack is prevented by blocking a write operation of a motor state to a first register, or wherein the output stream indicates an attack to a revolutions per minute (RPM) setpoint of the HM&E system and the attack is prevented by blocking a write operation to a second register; and
   wherein the deep packet inspection comprises checking specific fields within data messaging traffic within ICS protocol packets and blocking ICS protocol packets that do not meet ICS protocol conditions and rules.

2. The system of claim 1, wherein the ICS firewall hardware processors comprise an application programming interface (API) for uploading firewall policies and attaching the firewall policies to the ICS firewall network path.

3. The system of claim 1, wherein the ICS firewall hardware processors are configured to function as a sensor and an effector; and wherein the ICS firewall hardware processors employ a stateful policy enforcement that is specific to ICS operating constraints and ICS protocols.

4. The system of claim 1, wherein the dynamic policy engine hardware processor automates generation, deployment, and monitoring of the cyber security policies; and wherein the dynamic policy engine hardware processor is operable to whitelist capabilities of the ICS firewall hardware processors.

5. The system of claim 1, wherein the ICS firewall hardware processors execute policy rules which set and persist variables;
   wherein the variables comprise one or more of a literal value, a variable value, a value derived from the deep packet inspection, or a mathematical expression utilizing a mathematical operator such as addition, subtraction, division, multiplication, or modulo in combination with any of the literal value, the variable value, or the value derived from the deep packet inspection.

6. The system of claim 1, wherein the dynamic policy engine hardware processor generates policies which set ICS firewall variables as a state machine which instructs the ICS firewall hardware processors to employ stateful policy enforcement protections that dynamically adjust upon sensing feedback of system state.

7. The system of claim 1, wherein the dynamic policy engine hardware processor generates one or more ICS protocol specific policies to include submodules of policies with conditions to access different layers of data in the data network, and generates rules to perform actions based on the state of the ICS systems on the data network.

8. The system of claim 1, wherein the dynamic policy engine hardware processor converts XML models of the ICS systems and the components of the industrial system that uses ICS protocols; and
wherein the dynamic policy engine hardware processor is associated with deployments of the ICS firewall hardware processors between segments of the data network.

9. The system of claim 1, wherein the dynamic policy engine hardware processor monitors state information produced by logging rules in the ICS protocol-based policies and dynamically regenerates the ICS protocol-based policies and uploads the ICS protocol-based policies to the ICS firewall network path when defined in XML models to react to state transition triggers.

10. The system of claim 1, wherein the industrial system comprises a factory system or a power management system; and
wherein the model of the ICS firewall hardware processors comprises an XML-based model.

11. A process for providing security for information technology (IT) and operational technology (OT) networks associated with an industrial control system (ICS) comprising:
deploying an initial model for a particular IT and OT network; dynamically updating security policies as the particular IT and OT network are used, patched, and modified;
utilizing a deep packet inspection to enforce ICS constraints and ICS behaviors defined by the initial model, wherein the deep packet inspection comprises checking specific fields within data messaging traffic within ICS protocol packets and blocking ICS protocol packets that do not meet ICS protocol conditions and rules;
reporting a state of the deep packet inspection for situational awareness and debugging purposes; and
transmitting an alert or blocking ICS protocol traffic when anomalies are detected when the ICS protocol traffic traverses ICS firewall network paths that execute ICS policies;
wherein the ICS communicates via ICS protocols;
wherein the ICS comprises a shipboard hull, mechanical, and electrical (HM&E) system; and
wherein the ICS protocol traffic traversing ICS firewall network paths indicates an attack to a motor system to stop a propulsion system of the HM&E system and the attack is prevented by blocking a write operation of a motor state to a first register, or wherein the ICS protocol traffic traversing ICS firewall network indicates an attack to a revolutions per minute (RPM) setpoint of the HM&E system and the attack is prevented by blocking a write operation to a second register.

12. The process of claim 11, comprising converting XML models of the ICS constraints and the ICS behaviors into ICS firewall policies comprised of rules and conditions to check and enforce the ICS constraints and the ICS behaviors of the XML models;
wherein policies associated with ICS protocol network paths are uploaded to ICS firewalls and are attached to the ICS firewall network paths; and
comprising defining ICS component data, thereby reducing exposure and vulnerability of the ICS.

13. The process of claim 12, comprising generating cyber protection policies that instruct ICS firewalls to block an ICS protocol operation that references data that are not defined in an XML model and to transmit an alert regarding the blocking.

14. The process of claim 12, comprising generating cyber protection policies that instruct ICS firewalls to block an ICS protocol operation not defined as valid for defined components in an XML model and to transmit an alert regarding the blocking.

15. The process of claim 12, wherein the vulnerability of the ICS is reduced by defining component data of the ICS as valid discrete values or as a data range.

16. The process of claim 12, comprising generating cyber protection policies that instruct ICS firewalls to block an ICS protocol operation for a component that contains an invalid value and transmitting an alert regarding the blocking.

17. The process of claim 12, comprising defining valid value transitions of a component of the ICS, thereby reducing exposure and vulnerability of the ICS.

18. The process of claim 12, comprising generating cyber protection policies that instruct ICS firewalls to block an ICS protocol operation of a component of the ICS with a valid value when the system state does not match a value transition criterium and transmitting an alert regarding the blocking;
defining state machine elements in XML models of components of the ICS, thereby reducing exposure and vulnerability of the ICS; and
generating cyber protection policies that instruct the ICS firewalls to block or alert ICS protocol operations that do not meet criteria of a defined state machine.

* * * * *